(12) United States Patent
Mendelenko et al.

(10) Patent No.: US 9,674,483 B2
(45) Date of Patent: Jun. 6, 2017

(54) METHOD AND DEVICE FOR GENERATING A MOTION-COMPENSATED VIDEO FRAME

(71) Applicant: Huawei Technologies Co., Ltd., Shenzhen (CN)

(72) Inventors: Aleksey Valentinovich Mendelenko, Moscow (RU); Sergey Michailovich Sedunov, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/276,896

(22) Filed: Sep. 27, 2016

(65) Prior Publication Data

US 2017/0019624 A1     Jan. 19, 2017

Related U.S. Application Data

(63) Continuation of application No. PCT/RU2014/000224, filed on Mar. 28, 2014.

(51) Int. Cl.
    *H04N 7/01*         (2006.01)
    *H04N 5/14*         (2006.01)
    *H04N 19/573*     (2014.01)

(52) U.S. Cl.
    CPC ............. *H04N 7/014* (2013.01); *H04N 5/145* (2013.01); *H04N 19/573* (2014.11)

(58) Field of Classification Search
    CPC ...... H04N 7/014; H04N 19/573; H04N 5/145; H04N 19/521; H04N 19/51; H04N 19/513; H04N 7/01; H04N 5/14; H04N 5/21

USPC ....... 348/441, 451, 452, 458, 459, 699–701, 348/619, 620; 375/240.16
See application file for complete search history.

(56) References Cited

U.S. PATENT DOCUMENTS

| 2012/0033130 A1* | 2/2012 | Piek | G06T 7/215 |
| | | | 348/441 |
| 2013/0170551 A1* | 7/2013 | Liu | H04N 7/014 |
| | | | 375/240.16 |

\* cited by examiner

*Primary Examiner* — Sherrie Hsia
(74) *Attorney, Agent, or Firm* — Conley Rose, P.C.

(57) ABSTRACT

A method for generating a motion-compensated video frame based on four successive frames of an original video sequence is presented, where the four successive frames comprise frame A, frame B, frame C and frame D. The method comprises obtaining three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C; and generating the motion-compensated video frame based on interpolating between the frames B and C, using the three successive motion estimation pairs.

18 Claims, 21 Drawing Sheets

METHOD AND DEVICE FOR GENERATING A MOTION-COMPENSATED VIDEO FRAME

CROSS-REFERENCE TO RELATED APPLICATIONS

This application is a continuation of International Application No. PCT/RU2014/000224, filed on Mar. 28, 2014, which is hereby incorporated by reference in its entirety.

TECHNICAL FIELD

The present disclosure relates to a method and a device for generating a motion-compensated video frame. The disclosure further relates to motion vector interpolation in the field of image or video processing or more specifically to the field of image interpolation with a motion compensation applied in frame rate converters or image interpolation devices.

BACKGROUND

A motion compensated video interpolation is used for improving the quality of a video, e.g. for providing judder-free video as one example in the case of video processing or for reducing data volumes, for instance in the case of video compression. FIG. 1 illustrates a method of motion compensation video interpolation 100. Motion compensation video interpolation 100 generally consists of a motion estimation 101 and motion compensation 103. Video input 102 is stored in a video frame memory 105 storing frames 104, 106, 108, 110 of the video input 102. Motion estimation 101 and motion compensation 103 provide an interpolated video 112 as output by processing the frames 104, 106, 108, 110 of the video input 102.

A motion compensated video interpolation generally is followed by a motion estimation (ME) step. There are lot of ME block based algorithms, e.g. block-matching, three-dimensional recursive search (3DRS), Optical Flow, Phase Correlation, etc. These ME algorithms can be used with a motion compensated video interpolation. A motion estimator calculates a motion vector for each block of the pixels of a frame to interpolate, the image being temporally positioned between two neighboring frames of a digital television sequence. Block of pixels must contain at least one pixel. A motion vector is calculated for each of interpolated block of pixels of the image from the motion vectors that have already been calculated blocks of pixels and from the projection of a motion vector calculated for the previous source image and including the considered pixel. A motion compensated video interpolation generally requires true motion vector. Block based motion estimation leads to blocking artifact.

To reduce the block artifact an overlapped block motion compensated scheme (OBMC) is used. OBMC is briefly described in the following example. In the example, 9 blocks are involved in OBMC being indexed by variable $1 \leq i \leq 9$. Each block is of size 8*8. The upper left block is marked by index i=1, the central block by i=5 and the lower right block by index i=9.

In block motion compensation (BMC) image reconstruction, each block is associated with one motion vector and pixel prediction is obtained by copying and pasting the 8*8 block from the previous frame offset by the motion vector. No block overlapping happens in BMC during the copy-and-paste procedure. OBMC uses the enlarged block, called the domain of window support that is of size 16*16. A 16*16 window support function is described by the bilinear shape.

The OBMC linear estimator for a prediction pixel intensity $I_p$ can be written as $$I_p(\vec{x}) = \sum_{i=1}^{9} [W_i(\vec{x}_b) \cdot \hat{I}(\vec{x} - \vec{u}_i)], \quad (1)$$

where $\vec{x}$ is the absolute pixel position with respect to the frame coordinates, $\vec{x}_b$ is the pixel position relative to the coordinates of the current block within a block, $\vec{u}_i$ is motion vector of block i, $W_i$ is the weighting coefficient of block i, $\hat{I}$ is the previous reconstructed pixel intensity.

"H. Watanabe and S. Singhal "Windowed motion compensation", Proc, SPIE's Visual Comm. Image Processing VCIP, vol. 1605, pp 582-589" describes a method using the classical BMC motion search and applying OBMC only in reconstruction. This method has artifacts for motion vectors that cross interpolated pixels in object and/or uncovered areas.

For the copy-paste procedure in the majority of the cases a bilinear interpolation is used.

In the case of a frame to interpolate $I_\alpha$ between a previous frame $I_{old}$ and a current frame $I_{new}$, the previously defined motion vector points to a frame point of each frame. This frame point may either be a pixel, or a point located between 4 pixels. The bilinear interpolation is performed with 8 pixels, i.e. 4 pixels of the previous frame and 4 pixels of the current frame according to equation (2)

$$\left(\sum_{i=1}^{8} \alpha_i * V_i\right) \Big/ \sum_{i=1}^{8} \alpha_i, \quad (2)$$

where V1, V2, V3 and V4 designate pixels of the previous frame and V5, V6, V7 and V8 designate pixels of the current frame and $\alpha_1, \ldots, \alpha_8$ are weighting factors representative of the proximity of said pixels to the image point. Taking into account that motion estimation is never performed without errors, this type of compensated interpolation in movement contains visible defects in the image covered and uncovered areas. These defects disappear or appear between two successive frames since matching between pixels is not possible.

Frame interpolation algorithms are widely used at frame rate converters for creation of a judder-free video at a digital TV set, for example at 30 frames/second (sec) to 120 frames/sec. Real time frame motion compensation algorithms shall overcome the issues described in the following. A first issue is visible block artifacts because motion estimation has low spatial resolution, i.e. blocks. A second issue is the visible artifacts for covered and uncovered areas. The covered and uncovered areas disappear or appear between two successive frames since matching between these two frames is not possible. A third issue is optimization of algorithms for real-time hardware implementation.

U.S. Pat. No. 4,771,331 describes a motion compensating field interpolation method that allows the interpolation of several fields between every two transmitted fields of a digital television sequence. Using the model of translational displaced objects, a hierarchically structured displacement estimator is applied to cope with relatively large displacements. It provides a displacement vector with integer components for each picture element of the fields to be interpolated. A change detector is used to assure zero displacement vectors in unchanged areas. A two-coefficient spatial-temporal filter interpolates each picture element of the fields to be interpolated. This method has artifacts for motion vectors that cross interpolated pixels in object and/or uncovered areas.

U.S. Patent Publication No. 2007/0121725 describes a motion compensated frame interpolation apparatus and method that includes a motion vector interpolation module for an object and uncovered area to generate information for motion vectors that cross interpolated pixels in object and/or uncovered areas. A motion vector interpolation module for a covered area generates information for motion vectors that cross interpolated pixels in covered areas. A motion vector counter records a number of motion vectors that cross an interpolated pixel. A buffer for motion vector interpolation buffers the information for motion vectors that cross interpolated pixels in the object and/or uncovered areas and the covered areas. A video data interpolation module generates video data of the interpolated pixels in objects and/or uncovered areas and in the covered areas. No algorithm for detection of covered and uncovered areas is disclosed.

U.S. Pat. No. 8,223,839 B2 describes a motion compensated video interpolation that is not sensitive to the errors in the motion estimation vectors. The document proposes a motion compensated video interpolation method in which the interpolation step varies according to the amplitude and/or a reliability index of the estimated motion vector for the considered pixel. The number of pixels that is used for interpolation and the weighting factors associated with these pixels are made to vary according to the amplitude and/or reliability index of the estimated motion vector. No algorithm is disclosed for selection of neighbor pixels and thresholds for the amplitude of motion vectors.

SUMMARY

Object of the disclosure is to provide a method of interpolating a new frame between pairs of successive frames.

This object is achieved by the features of the independent claims. Further implementation forms are apparent from the dependent claims, the description and the figures.

Motion compensating frame interpolation method includes fixing erroneous motion vector in covered/uncovered areas that can be done by replacing the bad internal vector, i.e. the old-forward or new-backward vector with the inverted external vector, i.e. the old-backward or new-forward vector respectively. To get motion vector at the time position of the interpolated frame vector projection and selection of the correct vector including projected covered/uncovered areas is performed. Choosing the correct interpolation image side at the time position of the interpolated frame includes the projected covered/uncovered areas. The problem of block artifacts is solved as will be shown below (see sixth possible implementation form of the method according to the first aspect).

In order to describe the disclosure in detail, the following terms, abbreviations and notations will be used:
ME: Motion Estimation.
OBMC: overlapped block motion compensation.
BMC: block motion compensation.

A covered area may be defined as a background area that may be present in a previous frame but "covered," overlaid, or otherwise replaced by a moving object in a future frame.

An uncovered area may be defined as a background area that is covered by a moving object in a previous frame but "uncovered" in a future frame because of the moving object's movement.

According to a first aspect, the disclosure relates to a method for generating a motion-compensated video frame between pairs of successive frames of original sequence based on four successive frames of an original video sequence, the four successive frames comprising a first frame A, a second frame B, a third frame C and a fourth frame D, the method comprising obtaining three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C; and generating the motion-compensated video frame based on interpolating between the frames B and C, using the three successive motion estimation pairs.

By using three successive motion estimation pairs motion vector repairing problem in cover/uncover area can be solved. The method provides a real-time algorithm for judder-free video. Note that interpolation between pairs of successive frames is not performed between motion estimation pairs: three successive motion estimation pairs are used in vector repairing part.

In a first possible implementation form of the method according to the first aspect, the method comprises repairing the motion vector fields B_FWD and C_BCK to provide a repaired forward motion vector field REPAIRED_FWD from B to C and a repaired backward motion vector field REPAIRED_BCK from C to B.

By repairing the motion vector fields B_FWD and C_BCK, an accuracy of the interpolated video frame can be improved.

In a second possible implementation form of the method according to the first implementation form of the first aspect, each vector of the REPAIRED_FWD field is set either to a vector of the B_FWD field, taken at a same spatial position, or to an inverted vector of the B_BCK field, taken at a same spatial position; and each vector of the REPAIRED_BCK field is set either to a vector of the C_BCK field, taken at a same spatial position, or to an inverted vector of the C_FWD field, taken at a same spatial position.

The repaired vector fields can be easily computed by applying simple arithmetic operations.

In a third possible implementation form of the method according to the second implementation form of the first aspect, selection of each vector of the REPAIRED_FWD field between the corresponding vector of the B_FWD field and the corresponding inverted vector of the B_BCK field is based on a comparison of corresponding elements of two coincidence error fields, a B_FWD coincidence error field with respect to the B_FWD field and a B_BCK coincidence error field with respect to the B_BCK field; and selection of each vector of the REPAIRED_BCK field between the corresponding vector of the C_BCK field and the corresponding inverted vector of the C_FWD field is based on a comparison of corresponding elements of two coincidence error fields, a C_BCK coincidence error field with respect to the C_BCK field and a C_FWD coincidence error field with respect to the C_FWD field.

The comparison of the two coincidence error fields is easy to compute and provides a significant improvement in accuracy.

In a fourth possible implementation form of the method according to the third implementation form of the first aspect, the B_FWD coincidence error field is computed by spatial filtering of a raw B_FWD coincidence field; the B_BCK coincidence error field is computed by spatial filtering of a raw B_BCK coincidence field; the C_BCK coincidence error field is computed by spatial filtering of a raw C_BCK coincidence field; and the C_FWD coincidence error field is computed by spatial filtering of a raw C_FWD coincidence field.

By using spatial filtering of coincidence error field, noise in repaired motion vectors can be reduced such that the precision of the interpolation is improved.

In a fifth possible implementation form of the method according to the fourth implementation form of the first aspect, each element of the raw B_FWD coincidence field is computed by projecting the corresponding vector of the B_FWD field into a temporal position of the C frame, interpolating a value of the C_BCK vector field at the projected position, and computing an error distance between the original vector and the inverted value of the interpolated vector; each element of the raw B_BCK coincidence field is computed by projecting the corresponding vector of the B_BCK field into a temporal position of the A frame, interpolating a value of the A_FWD vector field at the projected position, and computing an error distance between the original vector and the inverted value of the interpolated vector; each element of the raw C_BCK coincidence field is computed by projecting the corresponding vector of the C_BCK field into a temporal position of the B frame, interpolating a value of the B_FWD vector field at the projected position, and computing an error distance between the original vector and the inverted value of the interpolated vector; and each element of the raw C_FWD coincidence field is computed by projecting the corresponding vector of the C_FWD field into a temporal position of the D frame, interpolating a value of the D_BCK vector field at the projected position, and computing an error distance between the original vector and the inverted value of the interpolated vector.

Geometric vector projection metrics are more robust than match quality-based metrics for motion vector repairing in cover/uncover area.

Note that there are a lot of possible implementation forms for repairing criteria. The geometric vector projection as described below is only one example. Other repair criteria, e.g. motion vector match quality-based can be used as well.

In a sixth possible implementation form of the method according to the first implementation form of the first aspect, the generation of the motion-compensated video frame is computed as a weighted average of four basic motion-compensated frames, comprising motion compensation from the B frame using the REPAIRED_FWD vector field, motion compensation from the B frame using the REPAIRED_BCK vector field, motion compensation from the C frame using the REPAIRED_FWD vector field and motion compensation from the C frame using the REPAIRED_BCK vector field.

By using the weighted average of the four basic motion-compensated frames, a preciseness of the interpolation can be improved.

In a seventh possible implementation form of the method according to the sixth implementation form of the first aspect, the weights of the four basic motion-compensated frames at each element of an output frame are computed using corresponding values of two scalar fields, named side selector field and vector selector field.

By using information from the side and vector selector fields, an accuracy of the interpolation can be additionally improved.

In an eighth possible implementation form of the method according to the seventh implementation form of the first aspect, the side selector field is computed using a result of spatial filtering of a raw side difference field, and the vector selector field is computed using a result of spatial filtering of a raw vector difference field.

By using spatial filtering, noise can be reduced such that the precision of the interpolation is improved.

In a ninth possible implementation form of the method according to the eighth implementation form of the first aspect, elements of the raw side difference field and elements of the raw vector difference field are computed using corresponding elements of four projection error fields, named forward native error field, forward foreign error field, backward native error field and backward foreign error field.

Native and foreign projection error fields are simple error correction measures that provide a high degree of motion compensation at low computational complexity.

In a tenth possible implementation form of the method according to the ninth implementation form of the first aspect, each element of the forward native error field is computed by taking a vector of the REPAIRED_FWD vector field at a current spatial position, applying the vector to the current spatial position at a temporal position of the interpolated frame, projecting the vector to a temporal position of the B frame, interpolating a value of the REPAIRED_FWD vector field at the projected position and computing an error distance between the original vector and the interpolated vector; each element of the forward foreign error field is computed by taking a vector of the REPAIRED-_FWD vector field at a current spatial position, applying the vector to the current spatial position at a temporal position of the interpolated frame, projecting the vector to a temporal position of the C frame, interpolating a value of the REPAIRED_BCK vector field at the projected position and computing an error distance between the original vector and the inverted value of the interpolated vector; each element of the backward native error field is computed by taking a vector of the REPAIRED_BCK vector field at a current spatial position, applying the vector to the current spatial position at a temporal position of the interpolated frame, projecting the vector to a temporal position of the C frame, interpolating a value of the REPAIRED_BCK vector field at the projected position and computing an error distance between the original vector and the interpolated vector; and each element of the backward foreign error field is computed by taking a vector of the REPAIRED_BCK vector field at a current spatial position, applying the vector to the current spatial position at a temporal position of the interpolated frame, projecting the vector to a temporal position of the B frame, interpolating a value of the REPAIRED_FWD vector field at the projected position and computing an error distance between the original vector and the inverted value of the interpolated vector.

Error distances based on geometric vector projection metrics are more robust than match quality-based metrics. When repairing the motion vector in covered/uncovered areas is decided by geometric vector coincidence metric, the repairing is more robust than by using match quality-based metrics.

According to a second aspect, the disclosure relates to a motion compensation device configured to generate a motion-compensated video frame based on four successive frames of an original video sequence, the four successive frames comprising a first frame A, a second frame B, a third frame C and a fourth frame D, the device comprising a receiving unit configured to obtain three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C; and a generation unit configured to generate the motion-compensated video frame based on interpolating between the frames B and C, using the three successive motion estimation pairs.

Using that simple kind of compensation avoids or at least reduces block artifacts at low hardware cost, using only block image access. The compensation is simple and suitable for real-time processing with low-cost hardware implementation.

According to a third aspect, the disclosure relates to a computer program product comprising a readable storage medium storing program code thereon for use by a computer, the program code providing a motion-compensated video frame based on four successive frames of an original video sequence, the four successive frames comprising a first frame A, a second frame B, a third frame C and a fourth frame D, the program code comprising instructions for obtaining three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C; and instructions for generating the motion-compensated video frame based on interpolating between the frames B and C, using the three successive motion estimation pairs.

The computer program can be flexibly designed such that an update of the requirements is easy to achieve. The computer program product may run on a multi core and many core processing system.

Aspects of the disclosure as described above offer the following advantages. The repairing of motion vector in covered/uncovered areas is decided by geometric vector coincidence metric, which is more robust than match quality-based metrics. The selection of motion vector and image interpolation side at the interpolated frame time is based on geometric vector projection metrics, which are more robust than match quality-based metrics. Block artifacts are avoided at low hardware cost, using only block image access. All algorithms are simple and suitable for real-time processing with low-cost hardware implementation.

Aspects of the disclosure thus provide an improved technique for video motion compensation as further described in the following.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on motion estimation and motion vector interpolation. It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The described devices and systems may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

Figure 2:
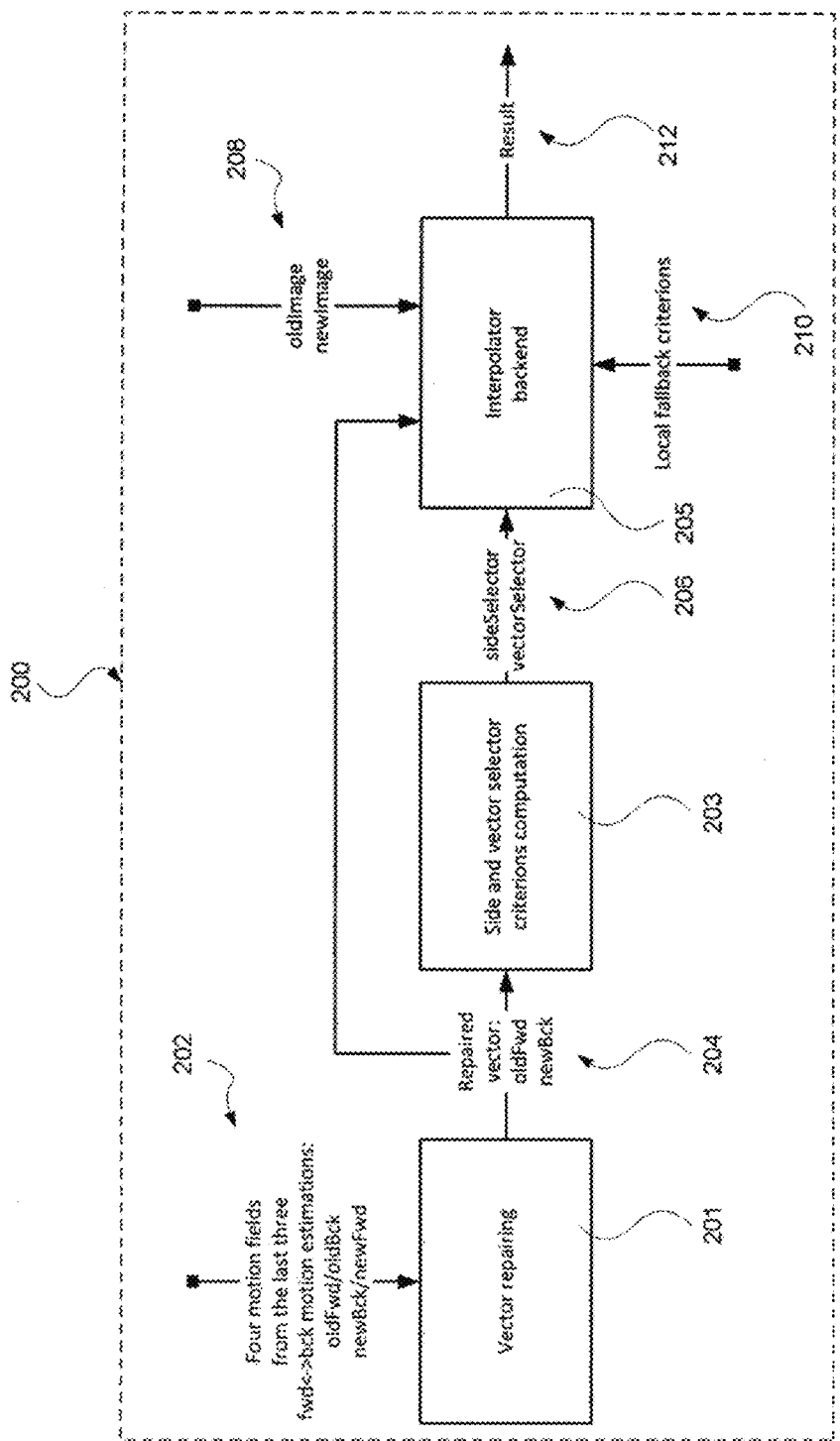
FIG. 2 shows a block diagram illustrating an exemplary motion compensator according to an implementation form.

FIG. 2 shows a block diagram illustrating an exemplary motion compensator 200 according to an implementation form.

The compensator 200 includes a vector repairing module 201, a side and vector selector module 203 and an interpolator backend 205.

The motion vector, the side selector, the vector selector, and the local fallback selectors may be two-dimensional (2D) fields in low resolution, for example, one value per 8×8 pixels. The low resolution may be named motion resolution. The side and vector selectors 206, as well as the fallback selectors 210, may be soft values in [0, 1] range. The compensator 200 may use four input motions fields 202 from last three forward-backward motion estimations and two input images that are the old and new frames. The vector repairing module 201 may be responsible for vector repairing in covered/uncovered areas. The side and vector selector module 203 may be responsible for computing side and vector criterions 206 used by the interpolator backend 205. The interpolator backend 205 may compute the final interpolated image 212 using the old and new images 208, the old and new repaired vector 204, the side and vector selectors 206 and the local fallback selectors 210.

Figure 3:
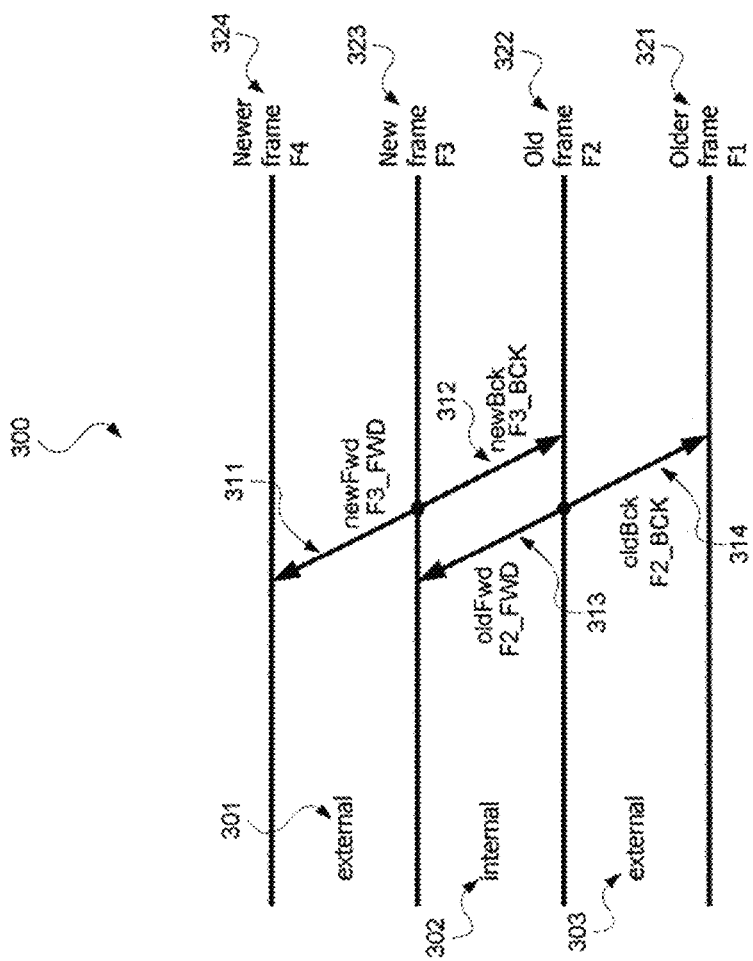
FIG. 3 shows a schematic frame representation diagram illustrating exemplary internal and external vectors that may be used in a vector repairing module of a motion compensator according to an implementation form.

FIG. 3 shows a schematic frame representation diagram 300 illustrating exemplary internal 302 and external 301, 303 vectors that may be used in a vector repairing module 201 of a motion compensator 200 according to an implementation form. The frame representation diagram 300 comprises four successive frames that are designated hereinafter with respect to their sequence in time as "Older frame" 321, "Old frame" 322, "New frame" 323 and "Newer frame" 324. The four successive frames 321, 322, 323, 324 may also be designated with respect to their sequence in time as first frame A, second frame B, third frame C and fourth frame D.

The vector repairing module 201 may use four motion vector fields or abbreviated as motion vectors or motion fields that are designated hereinafter as oldBck (old-backward) or F2_BCK 314, oldFwd (old-forward) or F2_FWD 313, newBck (new-backward) or F3_BCK 312, newFwd (new-forward) or F3_FWD 311. The oldFwd 313 and newBck 312 motion fields are named internal vector 302, the newFwd 311 and oldBck 314 motion fields are named external vector 301, 303.

Figure 1:
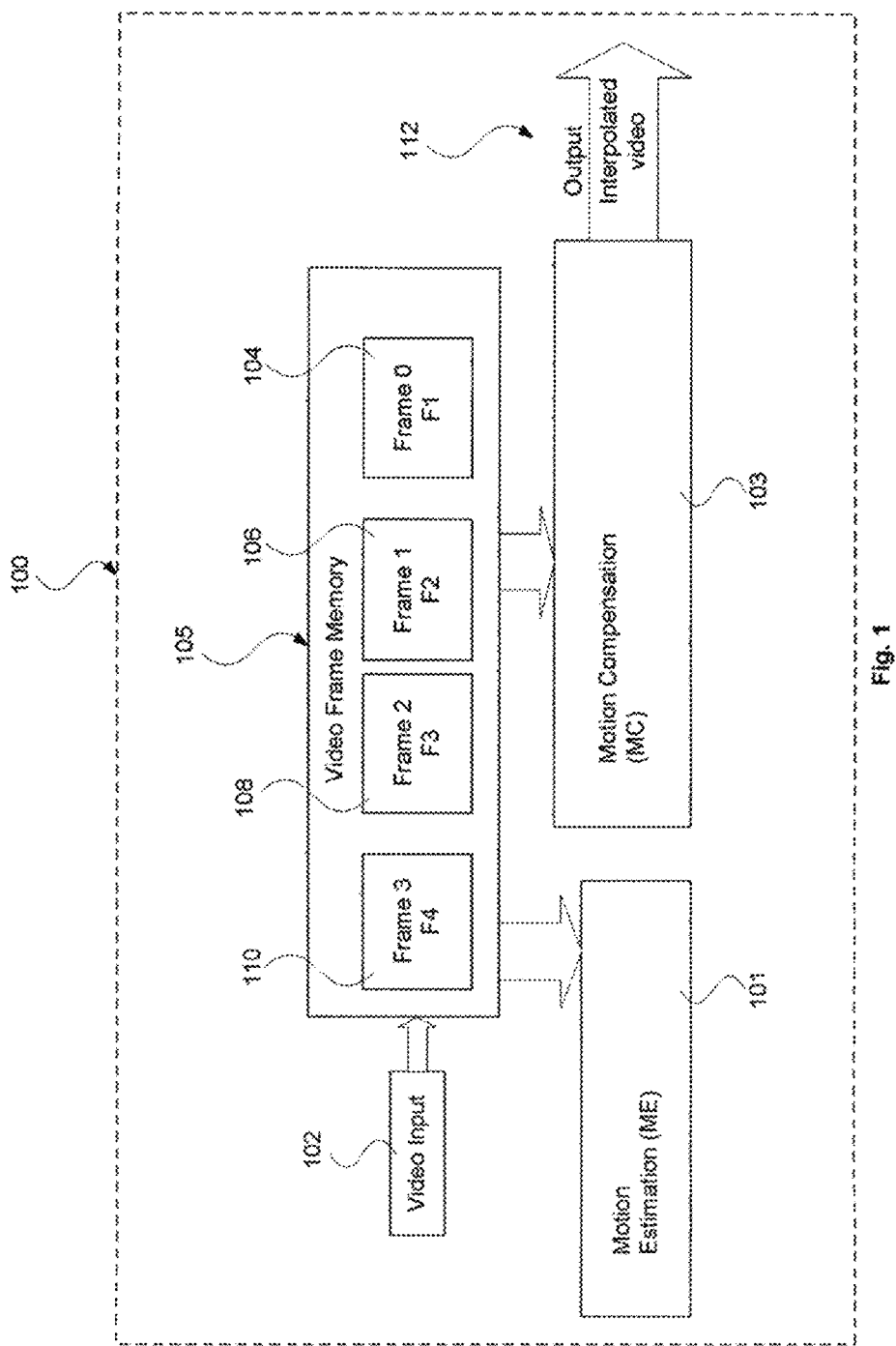
FIG. 1 illustrates a method of motion compensation video interpolation.

The motion estimation module 101 as described above with respect to FIG. 1 may provide the following three successive motion estimation pairs. A first pair may comprise the forward motion vector between the first frame A and the second frame B (not depicted in FIG. 3) and a backward motion vector between the second frame B and the first frame A corresponding to the oldBck 314 motion vector. A second pair may comprise a forward motion vector between the second frame B and the third frame C corresponding to the oldFwd 313 motion vector and a backward motion vector between the third frame C and the second frame B corresponding to the newBck 312 motion vector. A third pair may comprise a forward motion vector between the third frame C and the fourth frame D corresponding to the newFwd 311 motion vector and a backward motion vector between the fourth frame D and the third frame C (not depicted in FIG. 3).

Figure 4:
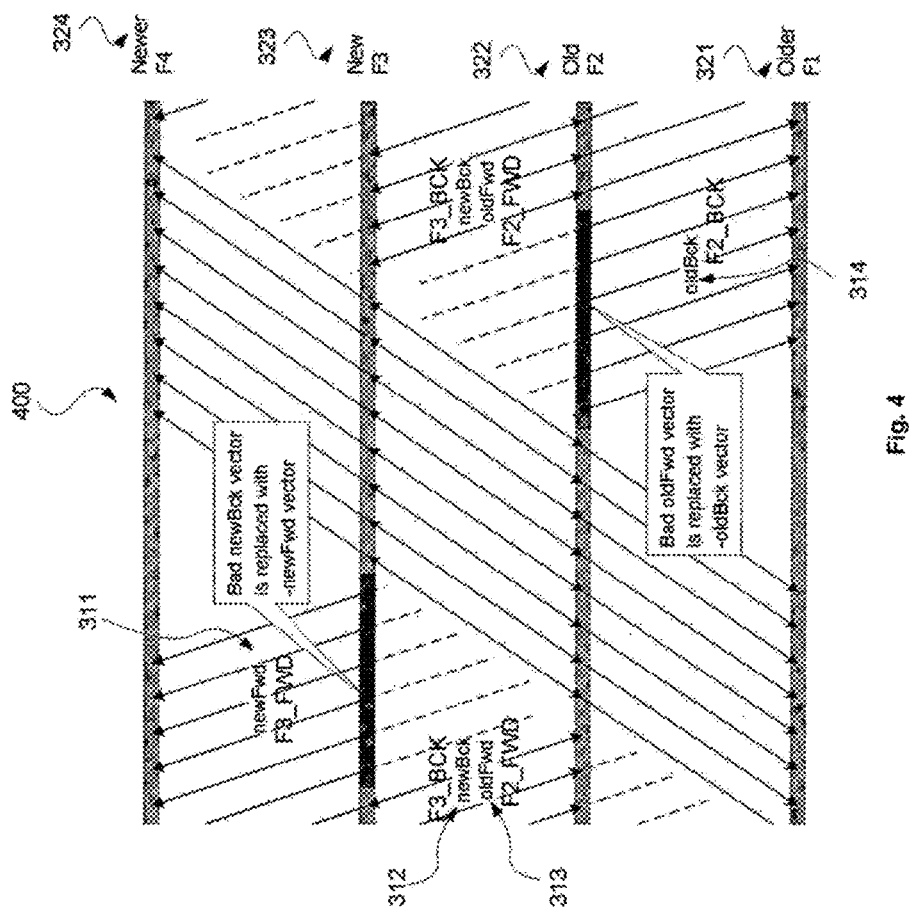
FIG. 4 shows a schematic frame representation diagram illustrating an exemplary vector repairing that may be applied in a vector repairing module of a motion compensator according to an implementation form.

FIG. 4 shows a schematic frame representation diagram illustrating an exemplary vector repairing 400 that may be applied in a vector repairing module 202 of a motion compensator 200 according to an implementation form. The frame representation diagram comprises the four successive frames "Older frame" 321, "Old frame" 322, "New frame" 323 and "Newer frame" 324 as described above with respect to FIG. 3. The four successive frames 321, 322, 323, 324 may also be designated with respect to their sequence in time as first frame A, second frame B, third frame C and fourth frame D as described above with respect to FIG. 3.

The motion pairs oldFwd/oldBck 313, 314 and newBck/newFwd 312, 311 may be used to repair the internal vector in covered/uncovered areas. A bad newBck motion vector 312 may be replaced with the inverse newFwd motion vector 311. A bad oldFwd motion vector 313 may be replaced with the inverse oldBck motion vector 314.

The old and new pairs may be used to produce the corrected old and new internal motion, providing repaired oldFwd and newBck motion fields 204 according to the representation in FIG. 2.

Figure 5:
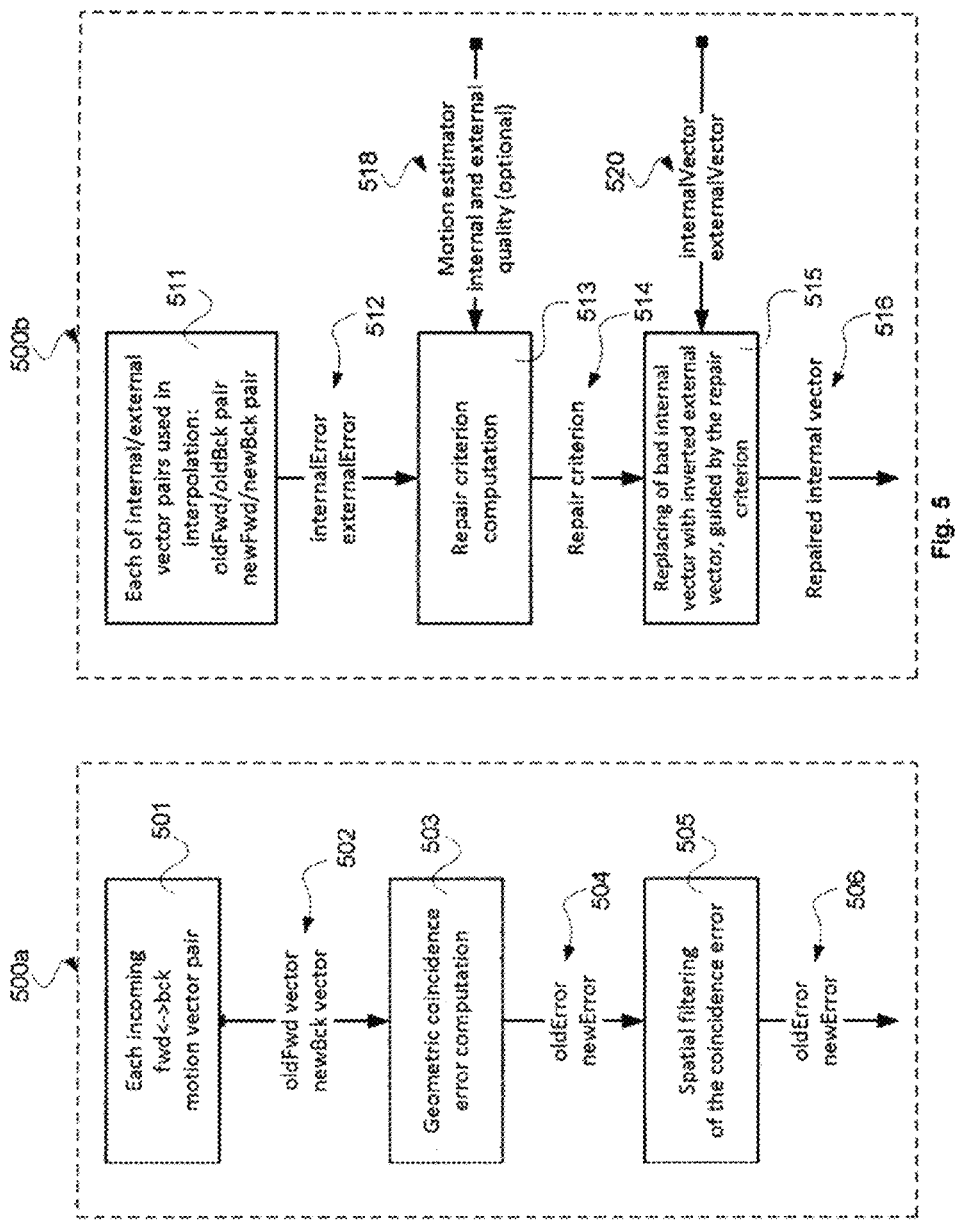
FIG. 5 shows a schematic diagram illustrating an exemplary vector repairing structure of a vector repairing module of a motion compensator according to an implementation form.

FIG. 5 shows schematic diagrams 500a and 500b illustrating an exemplary vector repairing structure of a vector repairing module 202 of a motion compensator 200 according to an implementation form. The vector repairing module 202 comprises a first module 500a for providing the old and new error 506 and a second module 500b for providing the repaired internal vector 516.

The first module 500a may include a first block 501 providing the oldFwd vector and the newBck vector 502 for each incoming forward/backward motion vector pair as specified above with respect to FIGS. 2 and 3. The first module 500a may include a second block 503 providing the coincidence errors 504 including the old error and the new error by geometric coincidence error computation based on the oldFwd vector and the newBck vector 502. The first module 500a may include a third block 505 providing a spatially filtered version 506 of the coincidence errors by spatial filtering of the coincidence errors 504.

The second module 500b may include a first block 511 providing the internal error and the external error 512 for each internal/external vector pair used in interpolation, i.e. for the oldFwd/oldBck pair and the newFwd/newBck pair as specified above with respect to FIGS. 2 and 3. The second module 500b may include a second block 513 providing the repair criterion 514 based on the internal error and the external error 512 and based on an optional internal and external quality 518 which may be provided by the motion estimator 101 as described above with respect to FIG. 1. The second module 500b may include a third block 515 providing the repaired internal vector 516 by replacing of bad internal vector with the inverted external vector 520, guided by the repair criterion 514. The internal vector and the external vector 520 may be specified as described above with respect to FIGS. 2 and 3.

The old and new coincidence error 504 as well as the motion vectors 520 may be 2D fields in motion resolution.

Figure 6:
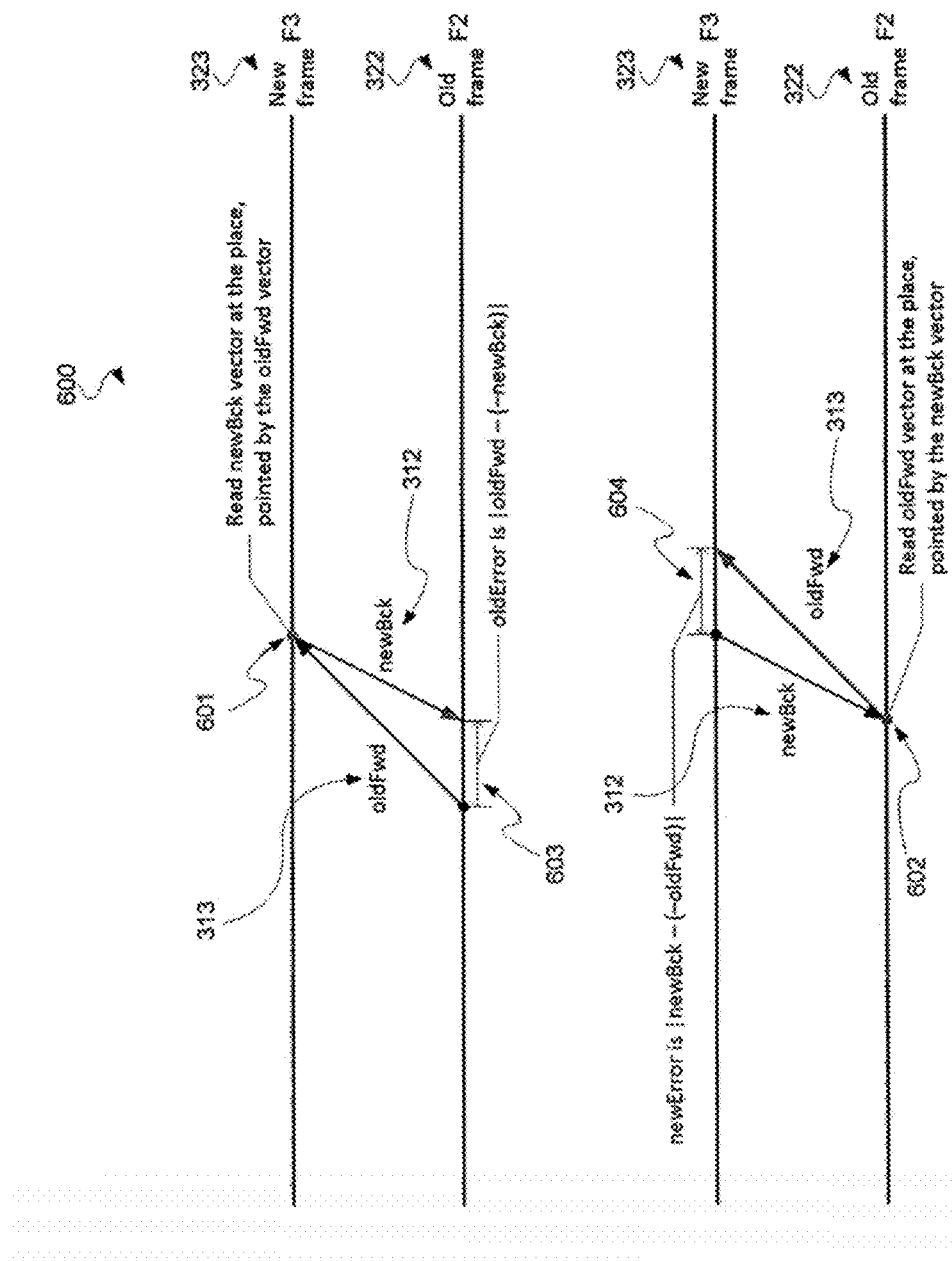
FIG. 6 shows a schematic diagram illustrating a geometric coincidence error that may be computed in a vector repairing module of a motion compensator according to an implementation form.

FIG. 6 shows a schematic diagram 600 illustrating a geometric coincidence error that may be computed in a vector repairing module 202 of a motion compensator 200 according to an implementation form.

For each incoming intra fwd<->bck motion field pair as specified above with respect to FIGS. 2 and 3, the geometric coincidence error may be computed, for both oldFwd vector 313 and newBck vector 312. The coincidence error may be computed by projecting the motion vector to the opposite side, reading the opposite vector at the projected location and comparing the inverted opposite vector to the original vector. The upper diagram shows reading the newBck vector 312 at the place pointed to by the oldFwd vector 313. The old error 603 may be computed as difference between oldFwd vector 313 and inverted newBck vector 312. The lower diagram shows reading the oldFwd vector 313 at the place pointed to by the newBck vector 312. The new error 604 may be computed as difference between newBck vector 312 and inverted oldFwd vector 313.

The vector difference metric may be an approximate Euclidean distance or any other metric. The reading of the opposite vector at a fractional position may be performed with some spatial interpolation, for example, bilinear interpolation.

Both old and new coincidence error maps may be spatially filtered. The filter may be linear or non-linear.

The old and new coincidence error may be stored in external memory queue to avoid re-computation or, alternatively, may be recomputed every time on-the-fly. The vector repairing in cover/uncover areas may be performed by replacing the bad internal vector with the inverted external vector, guided by the repair criterion. The repair criterion 514 may be computed by opposing the internal coincidence error to the external coincidence error and may also use the motion estimator's internal and external match quality 518 as described above with respect to FIG. 5.

Figure 7:
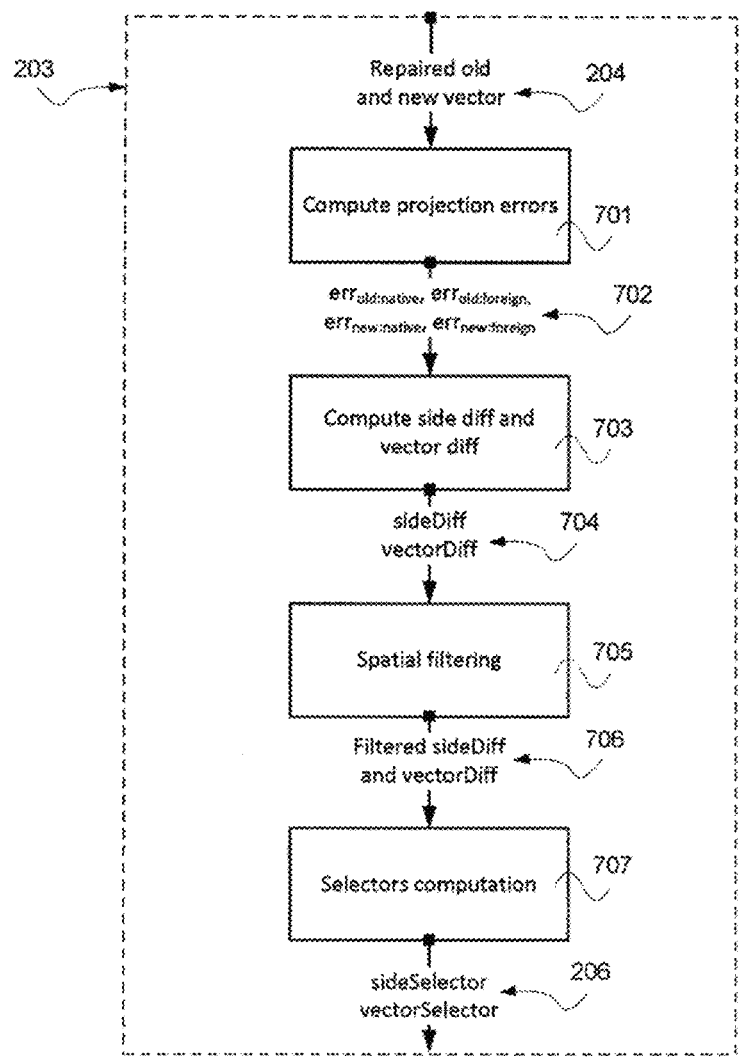
FIG. 7 shows a schematic diagram illustrating an exemplary computation of side and vector selector criteria that may be used in a side and vector selector criteria computation module of a motion compensator according to an implementation form.

FIG. 7 shows a schematic diagram illustrating an exemplary computation of side and vector selector criteria 206 that may be used in a side and vector selector criteria computation module 203 of a motion compensator 200 according to an implementation form.

The side selector and the vector selector 206 may be motion-resolution 2D fields that may be used by the interpolator backend 205 described above with respect to FIG. 2. The selectors 206 may be soft Boolean values in a [0,1] range.

The repaired old and new vector fields 204 may be used to compute projection errors in a first module 701 providing old native, old foreign, new native and new foreign projection errors 702. The projection errors 702 may be scalar values. The computation may be dependent on the temporal position of the interpolated frame a as described below. The projection errors 702 may be used in a second module 703 to compute the side difference (sideDiff) and the vector difference (vectorDiff) 704 that may be signed scalar values. The side difference and the vector difference 704 may be spatially filtered in a third module 705 providing filtered side difference and the filtered vector difference 706. The filtering may be linear or non-linear. The filtered side difference and the filtered vector difference 706 are used in a fourth module 707 to compute the side selector and the vector selector 206 that may be soft Boolean values.

Figure 8:
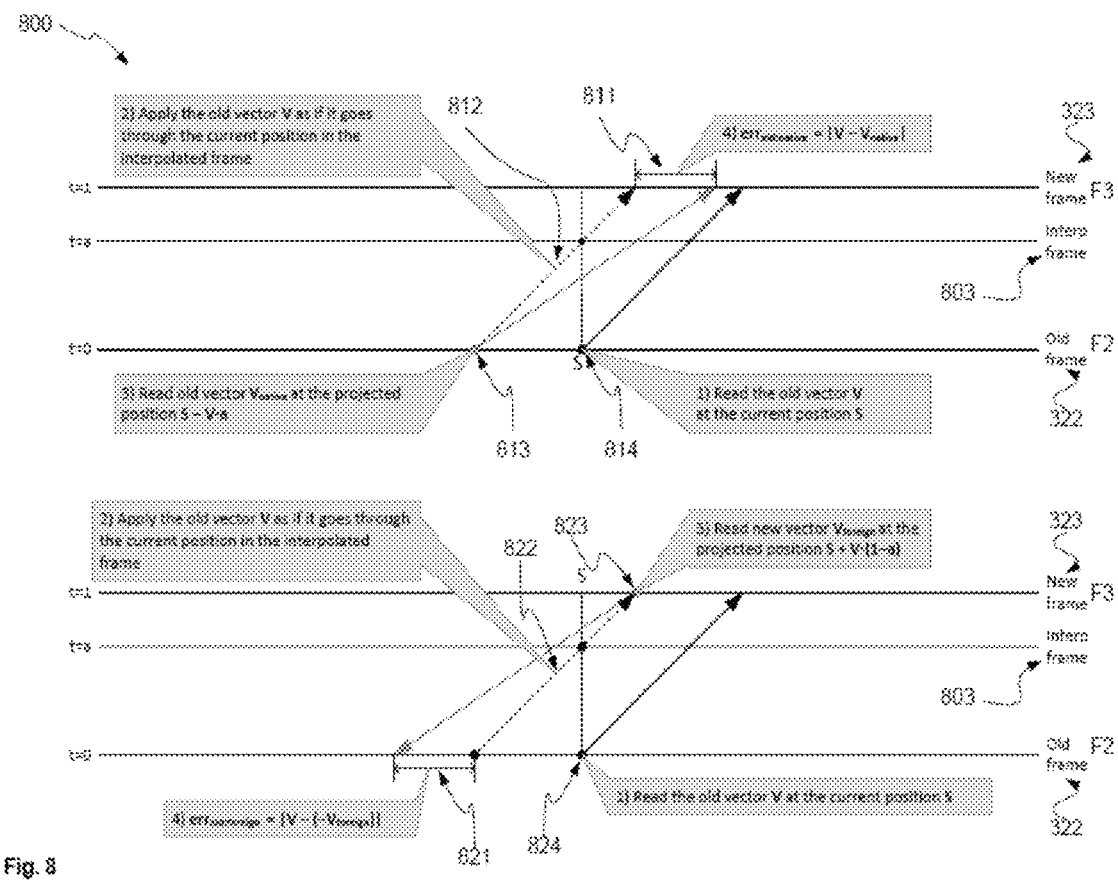
FIG. 8 shows a schematic diagram illustrating computation of old vector projection errors that may be used in a side and vector selector criteria computation module of a motion compensator according to an implementation form.

FIG. 8 shows a schematic diagram 800 illustrating computation of old vector projection errors that may be used in a side and vector selector criteria computation module 203 of a motion compensator 200 according to an implementation form.

An old frame 322 is received at time t=0 and a new frame 323 is received at time t=1. The interpolated frame 803 is provided at time t=a. Old frame 322 and new frame 323 and motion vectors may be specified as described above with respect to FIGS. 2 and 3.

The old native vector projection error may be computed by the following method as illustrated in the upper part of the diagram 800:
1) Read 814 the old vector V at the current position S in the old frame 322.
2) Apply 812 the old vector V as it goes through the current position in the interpolated frame 803.
3) Read 813 old vector $V_{native}$ at the projected position S−Vain the new frame 323.
4) Compute 811 old native error as $\text{err}_{oldnative} = |V - V_{native}|$.

The old foreign vector projection error may be computed by the following method as illustrated in the lower part of the diagram 800:
1) Read 824 the old vector V at the current position S in the old frame 322.
2) Apply 822 the old vector V as it goes through the current position in the interpolated frame 803.
3) Read 823 new vector $V_{foreign}$ at the projected position S+V(1-a) in the new frame 323.
4) Compute 821 old foreign error as $\text{err}_{oldforeign} = |V - (-V_{foreign})|$.

Figure 9:
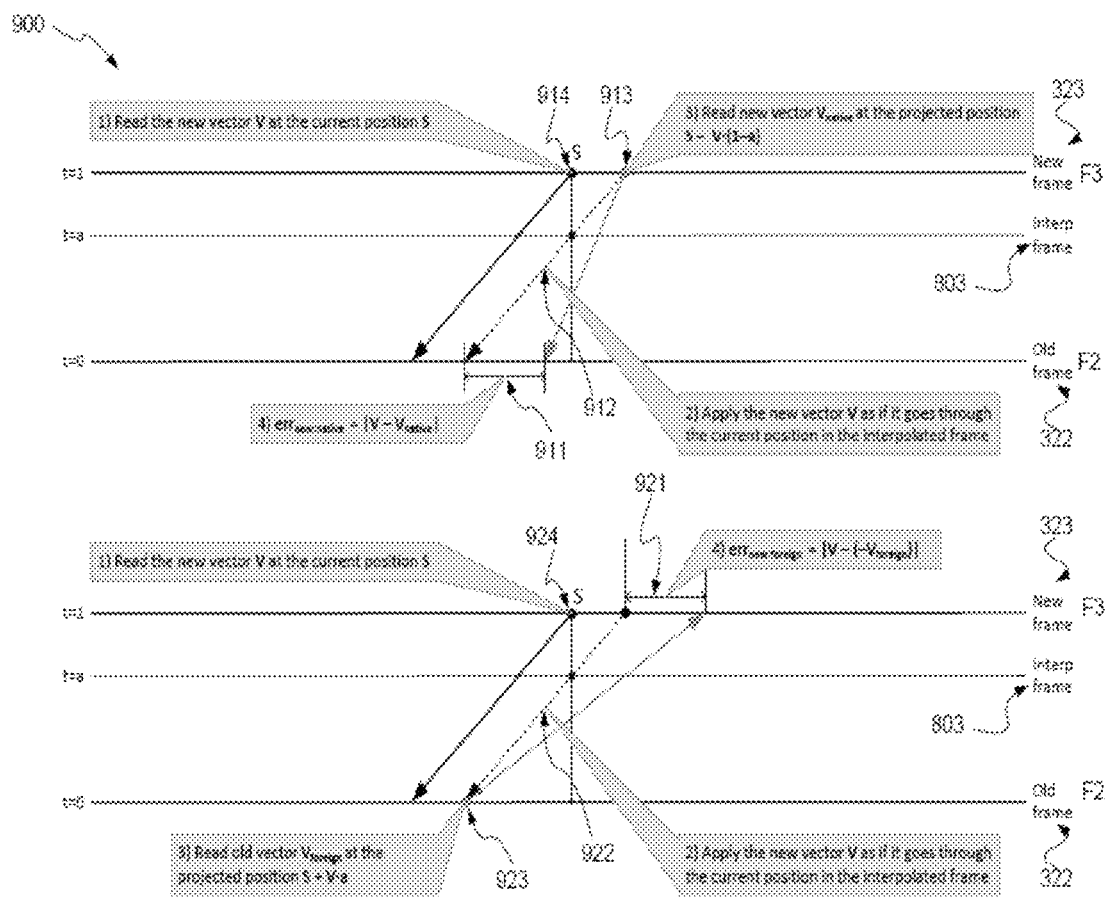
FIG. 9 shows a schematic diagram illustrating computation of new vector projection errors that may be used in a side and vector selector criteria computation module of a motion compensator according to an implementation form.

FIG. 9 shows a schematic diagram 900 illustrating computation of new vector projection errors that may be used in a side and vector selector criteria computation module 203 of a motion compensator 200 according to an implementation form.

An old frame 322 is received at time t=0 and a new frame 323 is received at time t=1. The interpolated frame 803 is provided at time t=a. Old frame 322 and new frame 323 and motion vectors may be specified as described above with respect to FIGS. 2 and 3.

The new native vector projection error may be computed by the following method as illustrated in the upper part of the diagram 900:
1) Read 914 the new vector V at the current position S in the new frame 323.
2) Apply 912 the new vector V as it goes through the current position in the interpolated frame 803.
3) Read 913 new vector $V_{native}$ at the projected position S−V(1-a) in the old frame 322.

4) Compute 911 new native error as err$_{newnative}$=|V−V$_{native}$|.

The new foreign vector projection error may be computed by the following method as illustrated in the lower part of the diagram 900:
1) Read 924 the new vector V at the current position S in the new frame 323.
2) Apply 922 the new vector V as it goes through the current position in the interpolated frame 803.
3) Read 923 old vector V$_{foreign}$ at the projected position S+Va in the old frame 322.
4) Compute 921 new foreign error as err$_{neworeign}$=|V−(−V$_{foreign}$)|.

The methods described in FIG. 8 and FIG. 9 may be implemented in a first module 701 for computing projection errors as described above with respect to FIG. 7.

The projection errors may be used to compute the side difference and the vector difference which may be signed scalar 2D fields in motion resolution, e.g. as described above with respect to FIG. 7, where the projection errors 702 are used by the second module 703 to compute the side difference and vector difference 704.

Figure 10:
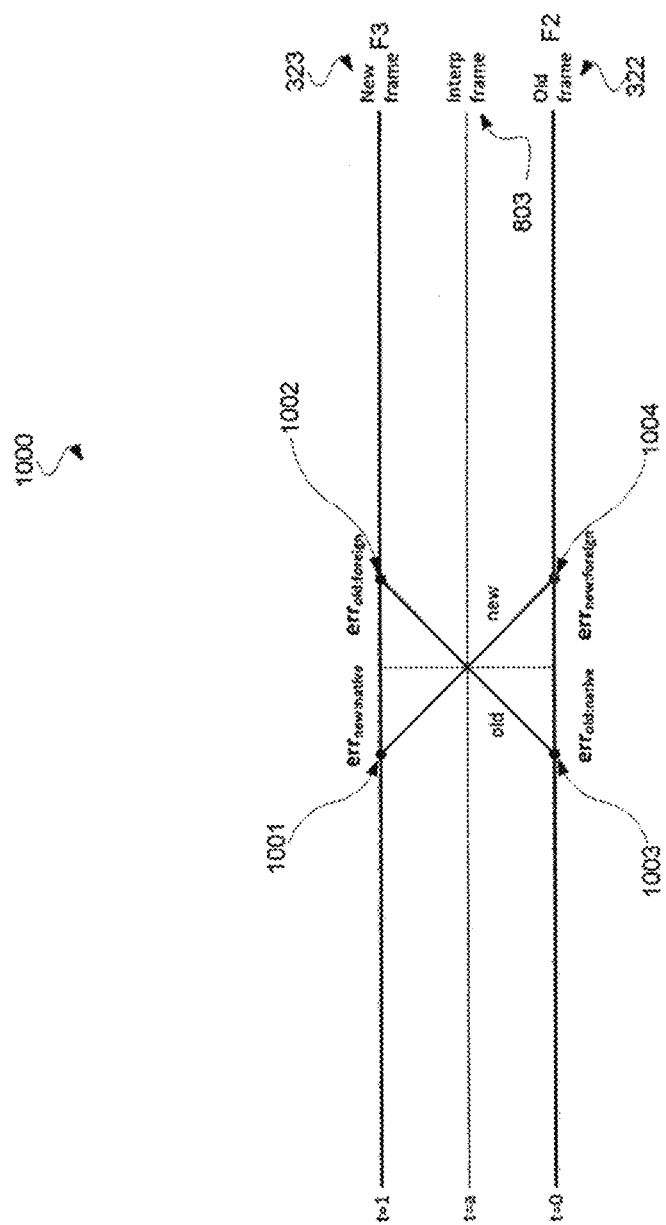
FIG. 10 shows a schematic diagram illustrating computation of side difference and vector difference that may be used in a side and vector selector criteria computation module of a motion compensator according to an implementation form.

FIG. 10 shows a schematic diagram 1000 illustrating computation of side difference and vector difference that may be used in a side and vector selector criteria computation module 203 of a motion compensator 200 according to an implementation form.

An old frame 322 is received at time t=0 and a new frame 323 is received at time t=1. The interpolated frame 803 is provided at time t=a. Old frame 322 and new frame 323 and motion vectors may be specified as described above with respect to FIGS. 2 and 3.

The side difference and the vector difference may be computed using the new foreign vector projection error 1004, the old foreign vector projection error 1002, the new native vector projection error 1001 and the old native vector projection error 1003 as described above with respect to FIGS. 8 and 9 according to the following formulas:

sideDiff=(err$_{old:native}$+err$_{new:foreign}$)−(err$_{new:native}$+err$_{old:foreign}$)     (3)

vectorDiff=(err$_{old:native}$+err$_{old:foreign}$)−(err$_{new:native}$+err$_{new:foreign}$)     (4)

The side difference and the vector difference may then be spatially filtered. The filter may be linear or non-linear. The side difference may be used to compute the side selector and the vector difference may be used to compute the vector selector. An example transfer function may be linear scaling followed by clamping to [0, 1] range. Other algorithms are also possible.

Figure 11:
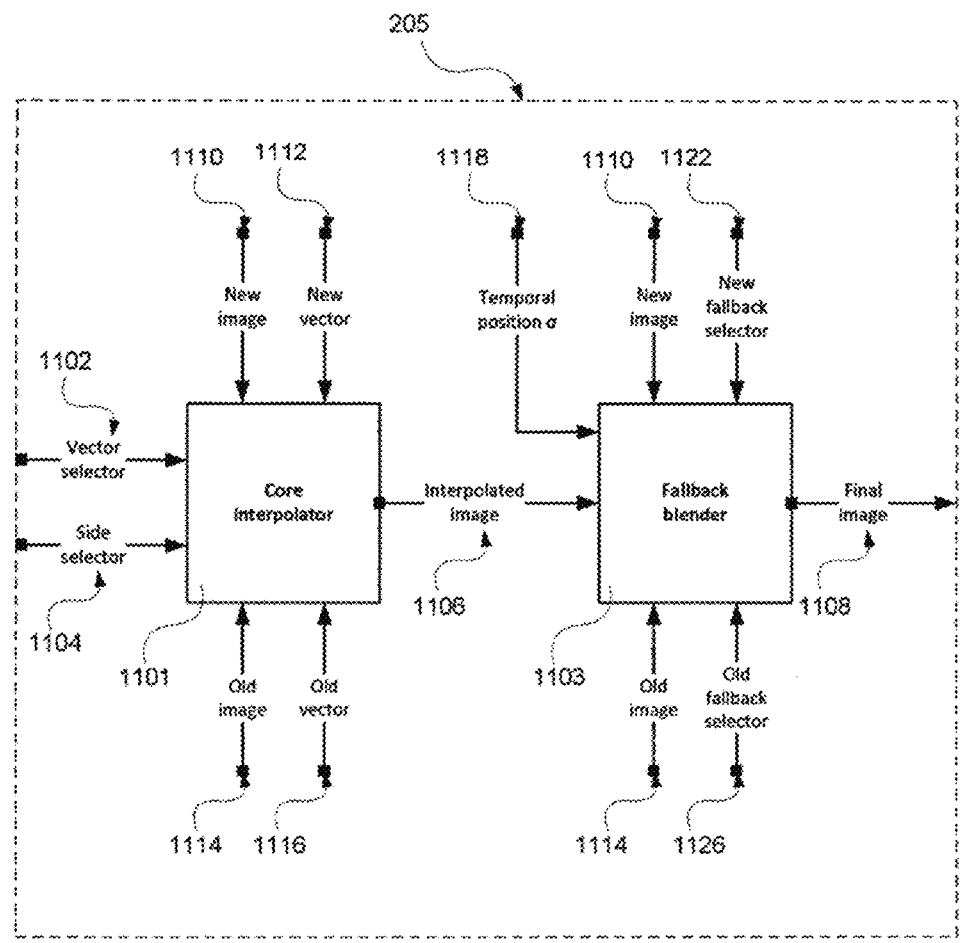
FIG. 11 shows a schematic diagram illustrating the structure of an exemplary interpolator backend of a motion compensator according to an implementation form.

FIG. 11 shows a schematic diagram illustrating the structure of an exemplary interpolator backend 205 of a motion compensator 200 according to an implementation form.

The core interpolator 1101 may provide an interpolated image 1106 based on a vector selector 1102, a side selector 1104, an old image 1114, a new image 1110, an old vector 1116 and a new vector 1112. The fallback blender 1103 may provide a final image 1108 based on the interpolated image 1106, the old image 1114, the new image 1110, an old fallback selector 1126, a new fallback selector 1122 and a temporal position 1118.

The images 1110, 1114 and motion vectors 1112, 1116 may be specified as described above with respect to FIGS. 2 and 3. The vector selector 1102 and the side selector 1104 may be computed in a side and vector selector criterions computation module 203 as described above with respect to FIG. 2 and FIG. 5 to FIG. 9.

The interpolator backend 205 may include a core interpolator 1101 and a fallback blender 1103. The old and new vector, the vector selector 1102, the side selector 1104, and the old 1126 and new 1122 fallback selector may be 2D fields in motion resolution. The old 1114 and new 1110 images, the interpolated image 1106 and the final image 1108 may be full-resolution color images.

Figure 12:
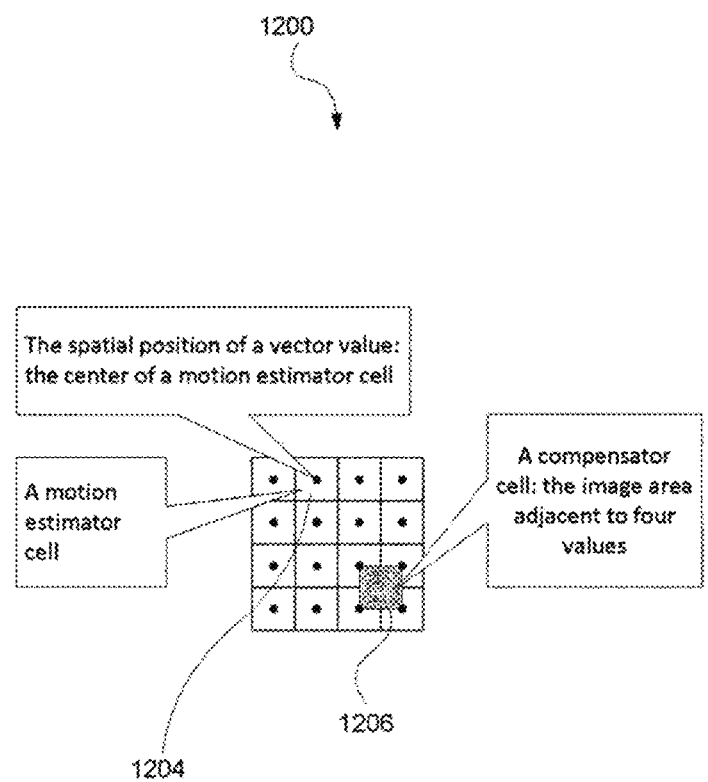
FIG. 12 shows a schematic diagram illustrating motion estimator cells and compensator cells that may be used in a motion estimator of a motion compensation video interpolation device according to an implementation form.

FIG. 12 shows a schematic diagram 1200 illustrating motion estimator cells 1204 and compensator cells 1206 that may be used in a motion estimator 101 of a motion compensation video interpolation device 100 according to an implementation form.

The motion vector may be defined in cell resolution. A cell 1204 may be defined as the elementary block of the motion estimator 101, for example of size 8×8 pixels. The spatial position of a vector value may be the center of a motion estimator cell 1204 as depicted in FIG. 12. The side selector, the vector selector and the local fallback selectors may be defined at the same spatial position, i.e. at the center of a motion estimator cell 1204.

To avoid block artifacts, the interpolator backend 205 may use spatial blending that is the spatial image blending of the motion vector and the spatial interpolation of all control criterions. The simplest possible spatial blending may be bilinear requiring four neighbor values. To reduce the number of image reads, the compensator target cells 1206 may be shifted ½ cell relative to the motion estimator cells 1204 thus touching only 2×2 neighbor values, i.e. vector values or control criterion values. Without such shift, 3×3 neighbor values would be needed.

Figure 13:
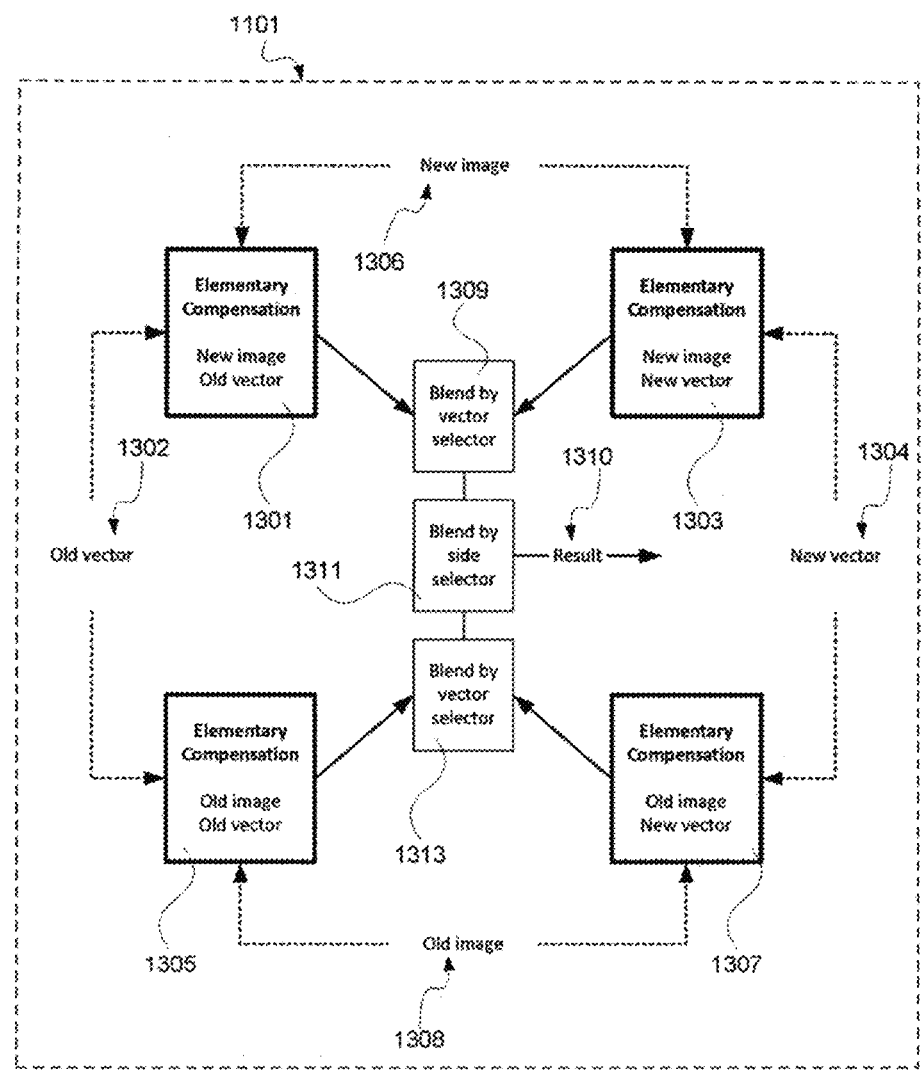
FIG. 13 shows a block diagram illustrating the structure of an exemplary core interpolator of an interpolator backend of a motion compensator according to an implementation form.

FIG. 13 shows a block diagram illustrating the structure of an exemplary core interpolator 1401 of an interpolator backend 1100 of a motion compensator 200 according to an implementation form.

Four elementary compensations 1301, 1303, 1305, 1307 may be performed, including a first elementary compensation 1305 from old image 1308 by old vector 1302; a second elementary compensation 1307, from old image 1308 by new vector 1304, a third elementary compensation 1301 from new image 1306 by old vector 1302 and a fourth elementary compensation 1303 from new image 1306 by new vector 1304.

The old and new vectors 1302, 1304 may be read at the current spatial position of the interpolated frame as described above with respect to FIGS. 8 and 9. Additionally, spatial motion blending 1309, 1311, 1313 may be used. The result 1310 of the four elementary compensations 1301, 1303, 1305, 1307 may be four image cells, for example, 8×8 pixel blocks. The four image cells may be blended according to the vector selector 1309, 1313 and the side selector 1311. The vector selector 1309, 1313 may control blending between old vector- and new vector-based compensations and the side selector 1311 may control blending between old image- and new image-based compensations.

As the vector and side selectors may be defined in cell resolution, inside a compensator cell these criteria may be interpolated using, for example, a bilinear interpolation as described in the following. $\alpha_X, \alpha_Y$ may be defined as the relative coordinates of a pixel inside a compensator cell, in a range [0, 1). An exemplary bilinear interpolation may be according to equation (5):

$$V' = [\text{linerp}(\alpha_Y, \text{linerp}(\alpha_X, V)]_{00}, V_{10}), \text{linerp}(\alpha_X, V_{01}, V_{11}))$$

linerp($\alpha$,A,B)=A+$\alpha$(B−A)     (5)

Here V is an interpolation criterion, for example the side selector, the vector selector or the local fallback selectors. V' is the value of the criterion computed for a pixel with relative coordinates $\alpha_X, \alpha_Y$ inside a compensator cell. $V_{00}$, $V_{01}$, $V_{10}$, $V_{11}$ are the known values of the criterion at the corners of the cell.

Figure 14:
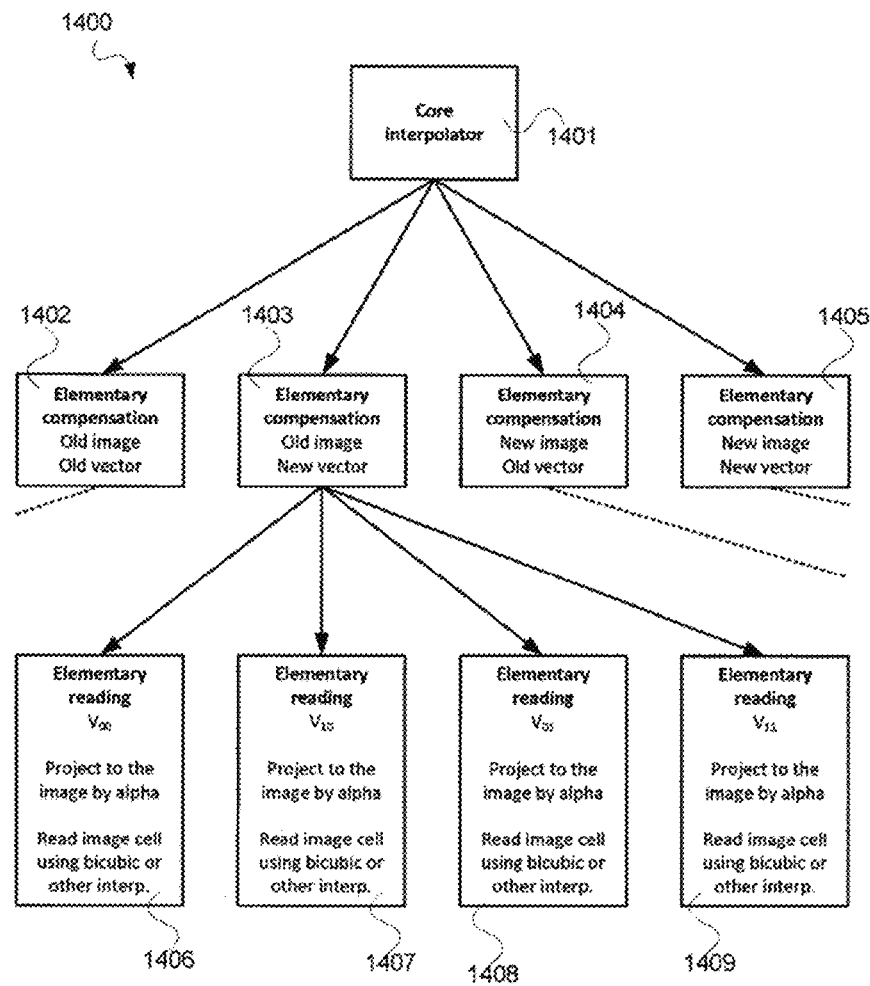
FIG. 14 shows a schematic diagram illustrating an exemplary image reading of a core interpolator 1101 as depicted in FIG. 13 according to an implementation form.

FIG. 14 shows a schematic diagram illustrating an exemplary image reading 1400 of a core interpolator 1101 as depicted in FIG. 13 according to an implementation form.

The core interpolator 1401 may perform four elementary compensations 1402, 1403, 1404, 1405, each performing four elementary image readings 1406, 1407, 1408, 1409. A first elementary compensation 1402 may read the old image by the old vector. A second elementary compensation 1403 may read the old image by the new vector. A third elementary compensation 1404 may read the new image by the old vector. A fourth elementary compensation 1405 may read the new image by the new vector.

A first elementary image reading $V_{00}$ 1406 may project to the image by alpha and read image cell using a bicubic or another interpolation. A second elementary image reading $V_{10}$ 1407 may project to the image by alpha and read image cell using a bicubic or another interpolation. A third elementary image reading $V_{01}$ 1408 may project to the image by alpha and read image cell using a bicubic or another interpolation. A fourth elementary image reading $V_{11}$ 1409 may project to the image by alpha and read image cell using a bicubic or another interpolation. Alpha may be a temporal position 1118 as specified above with respect to FIG. 11. Alpha may correspond to the temporal position t=a as described above with respect to FIGS. 8 and 9.

Figure 15:
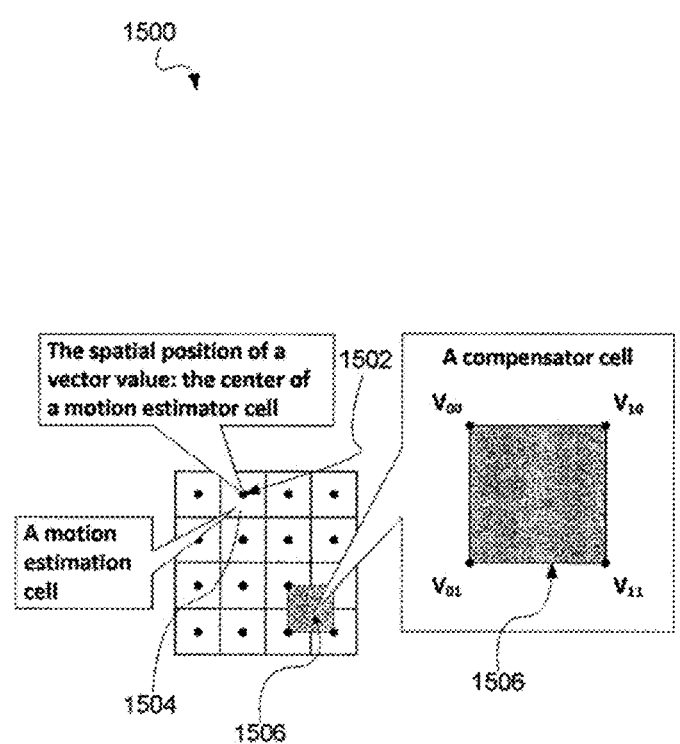
FIG. 15 shows a schematic diagram illustrating a compensator cell that may be used for the image reading depicted in FIG. 14 according to an implementation form.

FIG. 15 shows a schematic diagram 1500 illustrating a compensator cell 1506 that may be used for the image reading 1400 depicted in FIG. 14 according to an implementation form.

The elementary compensation may be motion compensation from single image side, performed by a single vector. The elementary compensation may require spatial motion blending to avoid block artifacts. To reduce the number of image reads, the compensator cells may be shifted ½ cell relative to the motion estimator cells 1504, thus touching only four vectors. The edges of the compensator cells may be read by the image readings $V_{00}$, $V_{10}$, $V_{01}$ and $V_{11}$ as described above with respect to FIG. 15.

Figure 16:
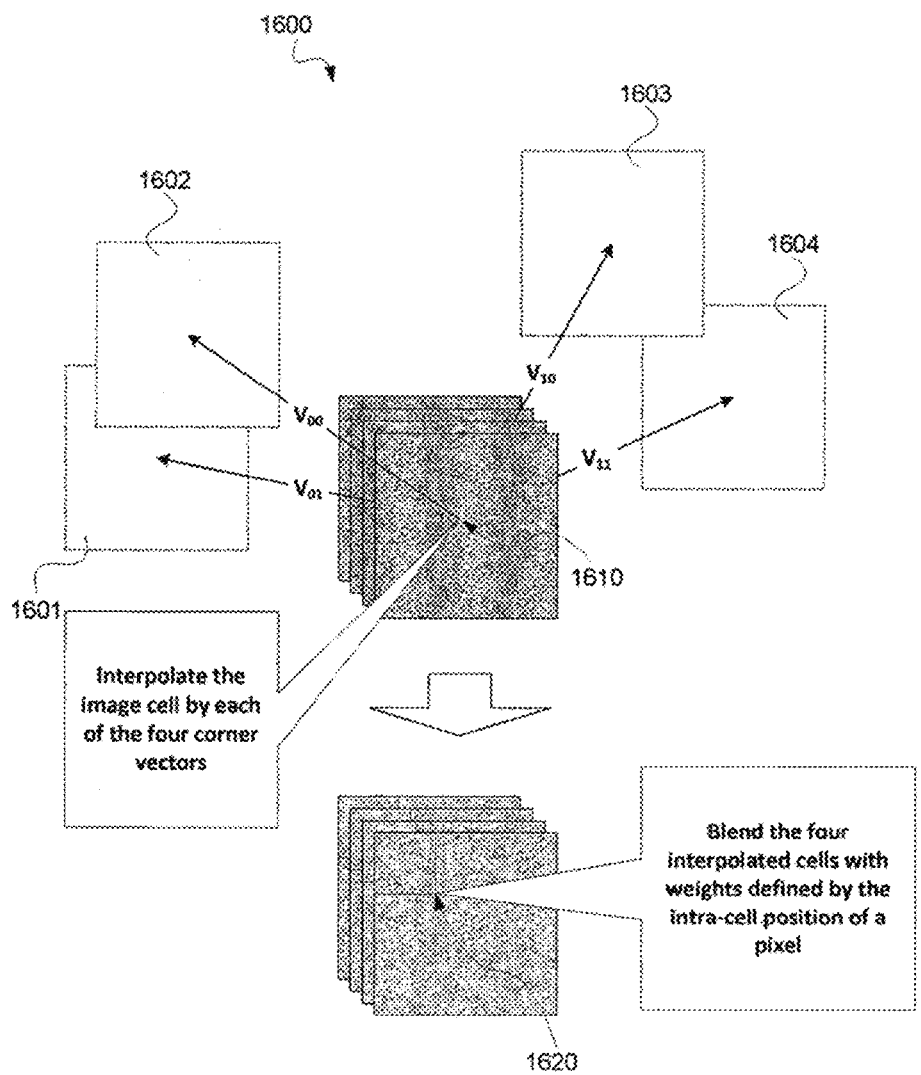
FIG. 16 shows a schematic diagram illustrating an exemplary elementary compensation that may be used for the image reading depicted in FIG. 14 according to an implementation form.

FIG. 16 shows a schematic diagram illustrating an exemplary elementary compensation 1600 that may be used for the image reading 1400 depicted in FIG. 14 according to an implementation form.

The spatial motion blending for a compensator cell 1610 may be performed as described in the following. Get four corner vectors, $V_{00}$, $V_{01}$, $V_{10}$, $V_{11}$ then read four image cells 1601, 1602, 1603, 1604 $I_{00}$, $I_{01}$, $I_{10}$, $I_{11}$ referenced by these vectors and finally blend the four image cells with weights according to an intra-cell pixel position, in bilinear fashion to obtain an interpolated cell 1620. The elementary compensation may be performed as follows. $\alpha_X, \alpha_Y$ may be defined as relative pixel coordinates inside a compensator cell in a range of [0, 1]. Then the following equations may be used for the interpolation:

$$\text{result}(\alpha_X,\alpha_Y)=\text{linerp}(\alpha_Y,\text{linerp}[\alpha_X,I_{00}(\alpha_X,\alpha_Y),I_{10}(\alpha_X,\alpha_Y)],\text{linerp}(\alpha_X,I_{01}(\alpha_X,\alpha_Y),I_{11}(\alpha_X,\alpha_Y)])\text{linerp}(\alpha,A,B)=A+\alpha(B-A)$$ (6)

Figure 17:
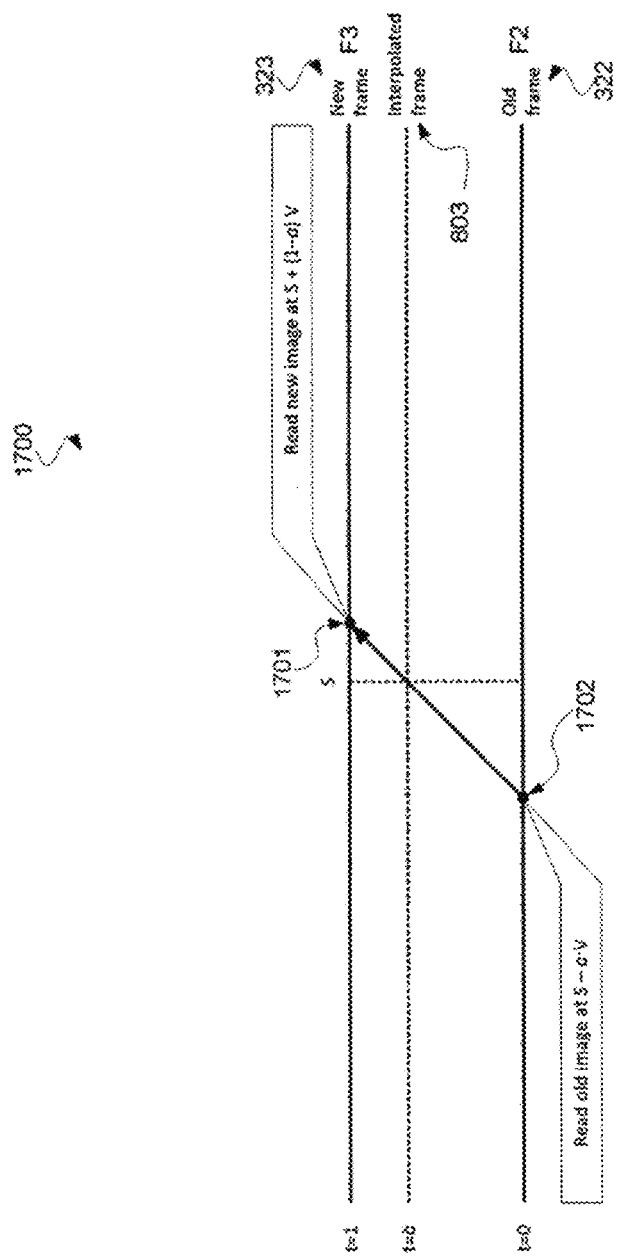
FIG. 17 shows a schematic diagram illustrating elementary image reading that may be used for the image reading depicted in FIG. 14 according to an implementation form.

FIG. 17 shows a schematic diagram illustrating elementary image reading 1700 that may be used for the image reading 1400 depicted in FIG. 14 according to an implementation form.

The old frame 322, the new frame 323 and the interpolated frame 803 may be specified as described above with respect to FIGS. 2 and 3 and FIGS. 8 and 9.

The elementary image reading may be the reading of an image cell, referenced by single projected motion vector. The projected image position may be fractional, so spatial image interpolation may be used, for example a bicubic interpolation.

V may specify a time-forward vector used for compensation, $\alpha$ may specify the temporal position of the interpolated frame in a range [0, 1] and S may specify the current spatial position of the interpolated frame.

The old image-based reading 1702 may be performed at the spatial position $S-\alpha V$ and the new image-based reading 1701 may be performed at the spatial position $S+(1-\alpha)V$.

The figure shows time-forward vector compensation for $V \leftarrow +V_{oldFwd}$. For time-backward vector compensation, the picture may be valid with the inverted vector, that is $V=-V_{newBck}$.

When performing an elementary compensation, four such projected image readings may be performed using four corner vectors of a cell, and then blended together as described above with respect to FIG. 16.

Figure 18:
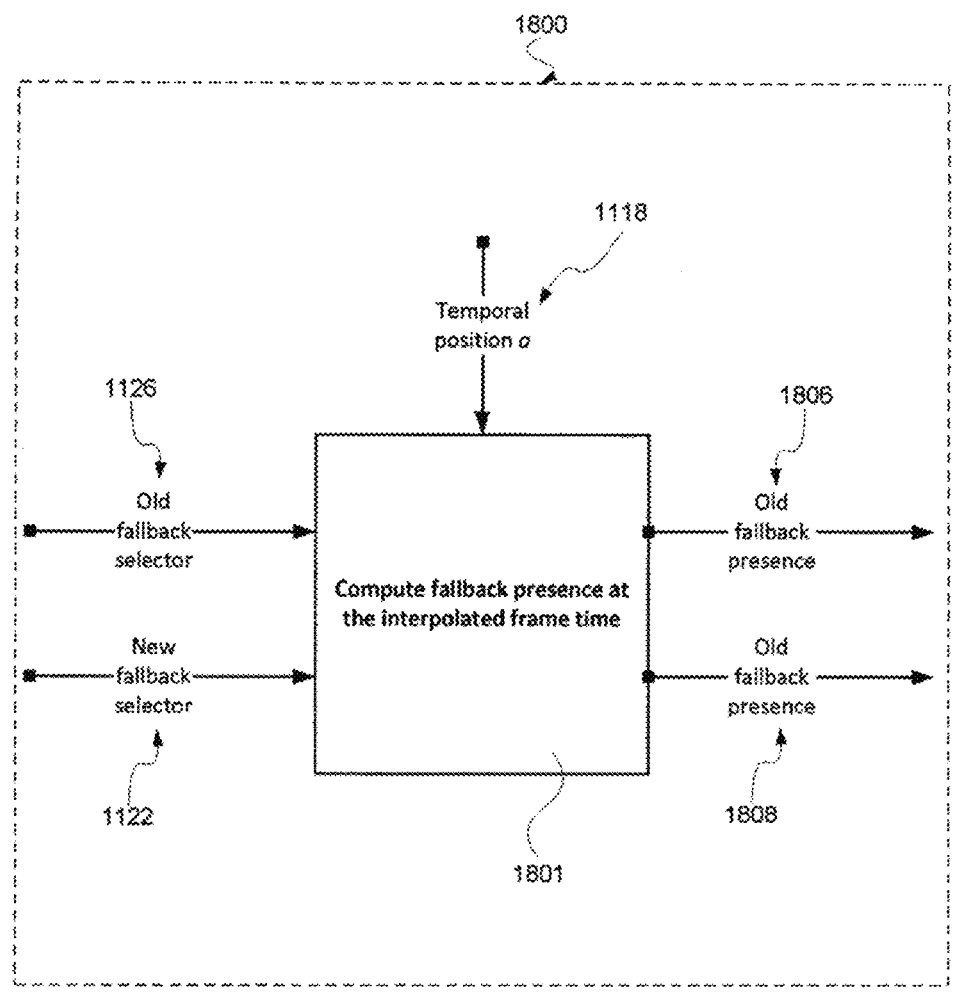
FIG. 18 shows a schematic diagram illustrating an exemplary local fallback presence computation module that may be used in a fallback blender of an interpolator backend of a motion compensator according to an implementation form.

FIG. 18 shows a schematic diagram illustrating an exemplary local fallback presence computation module 1800 that may be used in a fallback blender 1103 of an interpolator backend 1100 of a motion compensator 200 according to an implementation form.

The local fallback blender 1103 may be the final backend of the whole compensator 200 that may handle image areas with unrecognized motion. The control criterions of the local fallback blender 1103 may be the old 1126 and new 1122 local fallback selectors as described above with respect to FIG. 11. The old 1126 and new 1122 local fallback selectors may be 2D fields of soft values in a [0, 1] range for marking bad cells at the old and new images in motion resolution.

The local fallback selector values may be defined at the same spatial points as the motion vector, that is, at the centers of motion estimator cells. At the defined spatial points, the old and new fallback selectors 1126, 1122 may be used to compute the old 1806 and new 1808 fallback presence values that may be soft values in a [0, 1] range. These old 1806 and new 1808 fallback presence values may have the meaning of the fraction of the original old and new images in the final result at the interpolated frame time moment 1118. The presence computing may be performed by linear fading from the original image side to the opposite image side or may include some temporal shaping.

Figure 19:
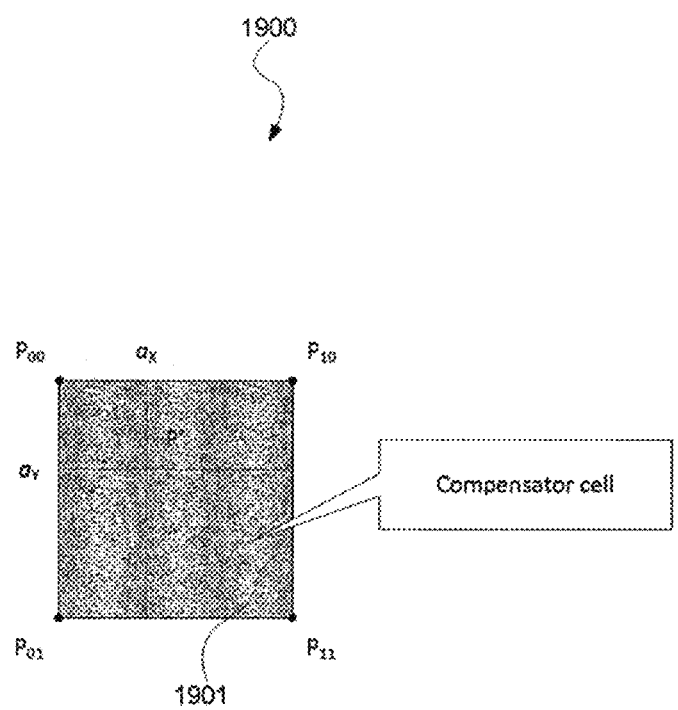
FIG. 19 shows a schematic diagram illustrating fallback presence spatial interpolation that may be used for spatial interpolation of the old and new fallback presences of the local fallback presence computation module depicted in FIG. 18 according to an implementation form.

FIG. 19 shows a schematic diagram illustrating fallback presence spatial interpolation 1900 that may be used for spatial interpolation of the old 1806 and new 1808 fallback presences of the local fallback presence computation module 1800 depicted in FIG. 18 according to an implementation form.

As the old and new fallback presences 1806, 1808 may be defined in cell resolution inside a compensator cell 1901 these criteria may be spatially interpolated, for example, using bilinear interpolation. FIG. 19 illustrates the interpolation of the local fallback presence 1806 in a compensator cell 1901. $P_{00}$, $P_{01}$, $P_{10}$, $P_{11}$ are the known values of the presence at the corners of the cell 1901, P' is the interpolated presence value at a pixel with relative intra-cell coordinates $\alpha_X, \alpha_Y$. The spatially interpolated values of the old and new fallback presences 1806, 1808 may be used to blend the fraction of the original old and new images, respectively, into the final result 1310 as depicted in FIG. 13.

Figure 20:
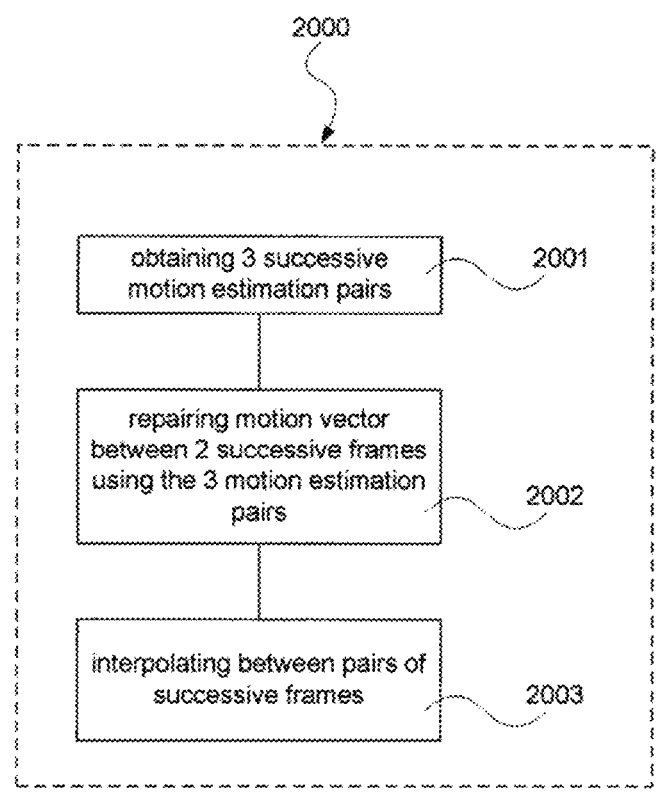
FIG. 20 shows a schematic diagram illustrating a method for generating a motion-compensated video frame according to an implementation form.

FIG. 20 shows a schematic diagram illustrating a method 2000 for generating a motion-compensated video frame based on four successive frames of an original video sequence, the four successive frames comprising a first frame A, a second frame B, a third frame C and a fourth frame D. The method 2000 may include obtaining 2001 three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C. The method 2000 may include generating the motion-compensated video frame based on interpolating 2003 between the frames B and C, using the three successive motion estimation pairs.

In one example, the method 2000 may include repairing 2002 the motion vector fields B_FWD and C_BCK to provide a repaired forward motion vector field REPAIRED_FWD from B to C and a repaired backward motion vector field REPAIRED_BCK from C to B.

The repairing may correspond to the repairing as described above with respect to FIG. 2 to FIG. 10.

In one example, each vector of the REPAIRED_FWD field may be set either to a vector of the B_FWD field, taken at a same spatial position, or to an inverted vector of the B_BCK field, taken at a same spatial position; and each vector of the REPAIRED_BCK field may be set either to a vector of the C_BCK field, taken at a same spatial position, or to an inverted vector of the C_FWD field, taken at a same spatial position, e.g. as described above with respect to FIG. 4.

In one example, selection of each vector of the REPAIRED_FWD field between the corresponding vector of the B_FWD field and the corresponding inverted vector of the B_BCK field may be based on a comparison of corresponding elements of two coincidence error fields, a B_FWD coincidence error field with respect to the B_FWD field and a B_BCK coincidence error field with respect to the B_BCK field; and selection of each vector of the REPAIRED_BCK field between the corresponding vector of the C_BCK field and the corresponding inverted vector of the C_FWD field may be based on a comparison of corresponding elements of two coincidence error fields, a C_BCK coincidence error field with respect to the C_BCK field and a C_FWD coincidence error field with respect to the C_FWD field, e.g. as described above with respect to FIG. 6.

In one example, the B_FWD coincidence error field may be computed by spatial filtering of a raw B_FWD coincidence field; the B_BCK coincidence error field may be computed by spatial filtering of a raw B_BCK coincidence field; the C_BCK coincidence error field may be computed by spatial filtering of a raw C_BCK coincidence field; and the C_FWD coincidence error field may be computed by spatial filtering of a raw C_FWD coincidence field, e.g. as described above with respect to FIG. 6.

In one example, each element of the raw B_FWD coincidence field may be computed by projecting the corresponding vector of the B_FWD field into a temporal position of the C frame, interpolating a value of the C_BCK vector field at the projected position, and computing an error distance between the original vector and the inverted value of the interpolated vector; each element of the raw B_BCK coincidence field may be computed by projecting the corresponding vector of the B_BCK field into a temporal position of the A frame, interpolating a value of the A_FWD vector field at the projected position, and computing an error distance between the original vector and the inverted value of the interpolated vector; each element of the raw C_BCK coincidence field may be computed by projecting the corresponding vector of the C_BCK field into a temporal position of the B frame, interpolating a value of the B_FWD vector field at the projected position, and computing an error distance between the original vector and the inverted value of the interpolated vector; and each element of the raw C_FWD coincidence field may be computed by projecting the corresponding vector of the C_FWD field into a temporal position of the D frame, interpolating a value of the D_BCK vector field at the projected position, and computing an error distance between the original vector and the inverted value of the interpolated vector, e.g. as described above with respect to FIGS. 8 and 9.

In one example, the generation of the motion-compensated video frame may be computed as a weighted average of four basic motion-compensated frames, including motion compensation from the B frame using the REPAIRED_FWD vector field, motion compensation from the B frame using the REPAIRED_BCK vector field, motion compensation from the C frame using the REPAIRED_FWD vector field and motion compensation from the C frame using the REPAIRED_BCK vector field, e.g. as described above with respect to FIG. 13.

In one example, the weights of the four basic motion-compensated frames at each element of an output frame may be computed using corresponding values of two scalar fields, named side selector field and vector selector field, e.g. as described above with respect to FIG. 7.

In one example, the side selector field may be computed using a result of spatial filtering of a raw side difference field, and the vector selector field may be computed using a result of spatial filtering of a raw vector difference field, e.g. as described above with respect to FIG. 7.

In one example, elements of the raw side difference field and elements of the raw vector difference field may be computed using corresponding elements of four projection error fields, named forward native error field, forward foreign error field, backward native error field and backward foreign error field, e.g. as described above with respect to FIGS. 8 and 9.

In one example, each element of the forward native error field may be computed by taking a vector of the REPAIRED_FWD vector field at a current spatial position, applying the vector to the current spatial position at a temporal position of the interpolated frame, projecting the vector to a temporal position of the B frame, interpolating a value of the REPAIRED_FWD vector field at the projected position and computing an error distance between the original vector and the interpolated vector; each element of the forward foreign error field may be computed by taking a vector of the REPAIRED_FWD vector field at a current spatial position, applying the vector to the current spatial position at a temporal position of the interpolated frame, projecting the vector to a temporal position of the C frame, interpolating a value of the REPAIRED_BCK vector field at the projected position and computing an error distance between the original vector and the inverted value of the interpolated vector; each element of the backward native error field may be computed by taking a vector of the REPAIRED_BCK vector field at a current spatial position, applying the vector to the current spatial position at a temporal position of the interpolated frame, projecting the vector to a temporal position of the C frame, interpolating a value of the REPAIRED_BCK vector field at the projected position and computing an error distance between the original vector and the interpolated vector; and each element of the backward foreign error field may be computed by taking a vector of the REPAIRED_BCK vector field at a current spatial position, applying the vector to the current spatial position at a temporal position of the interpolated frame, projecting the vector to a temporal position of the B frame, interpolating a value of the REPAIRED_FWD vector field at the projected position and computing an error distance between the original vector and the inverted value of the interpolated vector, e.g. as described above with respect to FIGS. 8 and 9.

Figure 21:
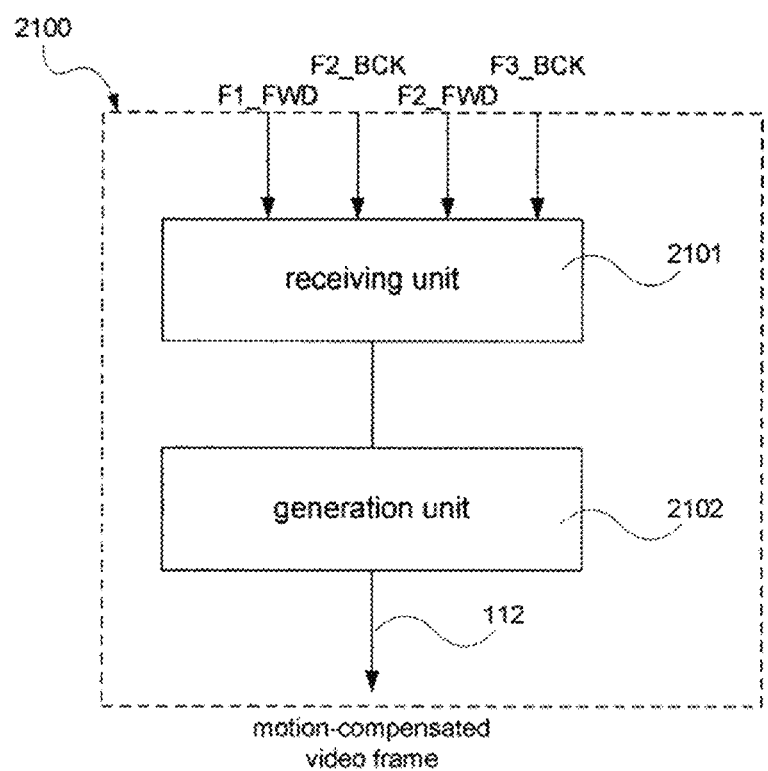
FIG. 21 shows a block diagram illustrating a motion compensator for generating a motion-compensated video frame according to an implementation form.

The method 2000 may be implemented on a motion compensator 2100 as depicted in FIG. 21. Such a motion compensator 2100 may be configured to generate a motion-compensated video frame 112 based on four successive frames of an original video sequence, the four successive frames comprising a first frame A, a second frame B, a third frame C and a fourth frame D. The motion compensator 2100 may include a receiving unit 2101 configured to obtain 2001 three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C. The motion compensation device 2100 may include a generation unit 2102 configured to generate the motion-compensated video frame 112 based on interpolating 2002 between the frames B and C, using the three successive motion estimation pairs. The generation unit 2102 may include the blocks 201, 203, 205 as described above with respect to FIG. 2 and FIG. 3 to FIG. 19.

The methods, systems and devices described herein may be implemented as software in a Digital Signal Processor (DSP), in a micro-controller or in any other side-processor or as hardware circuit within an application specific integrated circuit (ASIC).

The disclosure can be implemented in digital electronic circuitry, or in computer hardware, firmware, software, or in combinations thereof, e.g. in available hardware of conventional mobile devices or in new hardware dedicated for processing the methods described herein.

The present disclosure also supports a computer program product including computer executable code or computer executable instructions that, when executed, causes at least one computer to execute the performing and computing steps described herein, in particular the method 2000 as described above with respect to FIG. 20 and the techniques described above with respect to FIG. 2 to FIG. 19. Such a computer program product may include a readable storage medium storing program code thereon for use by a computer.

The program code may be configured to generate a motion-compensated video frame 112 based on four successive frames of an original video sequence, the four successive frames comprising a first frame A, a second frame B, a third frame C and a fourth frame D, e.g. as described above with respect to FIG. 2 to FIG. 4. The program code may include instructions for obtaining 2001 three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B and wherein a third pair comprises a forward motion vector field C_FWD from C to D and a backward motion vector field D_BCK from D to the C. The program code may include instructions for generating the motion-compensated video frame based on interpolating 2002 between the frames B and C, using the three successive motion estimation pairs.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A method for generating a motion-compensated video frame based on four successive frames of an original video sequence, wherein the four successive frames comprise a first frame A, a second frame B, a third frame C and a fourth frame D, the method comprising:
   obtaining three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B, and wherein a third pair comprises a forward motion vector field C_FWD from C to D and a backward motion vector field D_BCK from D to the C; and
   generating the motion-compensated video frame based on interpolating between the frames B and C, using the three successive motion estimation pairs.

2. The method of claim 1, further comprising repairing the motion vector fields B_FWD and C_BCK to provide a repaired forward motion vector field REPAIRED_FWD from B to C and a repaired backward motion vector field REPAIRED_BCK from C to B.

3. The method of claim 2, wherein each vector of the REPAIRED_FWD field is set either to a vector of the B_FWD field taken at a same spatial position, or to an inverted vector of the B_BCK field taken at a same spatial position, and wherein each vector of the REPAIRED_BCK field is set either to a vector of the C_BCK field taken at a same spatial position, or to an inverted vector of the C_FWD field taken at a same spatial position.

4. The method of claim 3, wherein selection of each vector of the REPAIRED_FWD field between the corresponding vector of the B_FWD field and the corresponding inverted vector of the B_BCK field is based on a comparison of corresponding elements of two coincidence error fields, a B_FWD coincidence error field with respect to the B_FWD field and a B_BCK coincidence error field with respect to the B_BCK field, and wherein selection of each vector of the REPAIRED_BCK field between the corresponding vector of the C_BCK field and the corresponding inverted vector of the C_FWD field is based on a comparison of corresponding elements of two coincidence error fields, a C_BCK coincidence error field with respect to the C_BCK field and a C_FWD coincidence error field with respect to the C_FWD field.

5. The method of claim 4, wherein the B_FWD coincidence error field is computed by spatial filtering of a raw B_FWD coincidence field, wherein the B_BCK coincidence error field is computed by spatial filtering of a raw B_BCK coincidence field wherein the C_BCK coincidence error field is computed by spatial filtering of a raw C_BCK coincidence field, and wherein the C_FWD coincidence error field is computed by spatial filtering of a raw C_FWD coincidence field.

6. The method of claim 5, wherein each element of the raw B_FWD coincidence field is computed by:
projecting the corresponding vector of the B_FWD field into a temporal position of the C frame;
interpolating a value of the C_BCK vector field at the projected position; and
computing an error distance between the original vector and the inverted value of the interpolated vector,
wherein each element of the raw B_BCK coincidence field is computed by:
projecting the corresponding vector of the B_BCK field into a temporal position of the A frame;
interpolating a value of the A_FWD vector field at the projected position; and
computing an error distance between the original vector and the inverted value of the interpolated vector,
wherein each element of the raw C_BCK coincidence field is computed by:
projecting the corresponding vector of the C_BCK field into a temporal position of the B frame;
interpolating a value of the B_FWD vector field at the projected position; and
computing an error distance between the original vector and the inverted value of the interpolated vector, and
wherein each element of the raw C_FWD coincidence field is computed by:
projecting the corresponding vector of the C_FWD field into a temporal position of the D frame;
interpolating a value of the D_BCK vector field at the projected position; and
computing an error distance between the original vector and the inverted value of the interpolated vector.

7. The method of claim 2, wherein generation of the motion-compensated video frame is computed as a weighted average of four basic motion-compensated frames, comprising:
motion compensation from the B frame using the REPAIRED_FWD vector field;
motion compensation from the B frame using the REPAIRED_BCK vector field;
motion compensation from the C frame using the REPAIRED_FWD vector field; and
motion compensation from the C frame using the REPAIRED_BCK vector field.

8. The method of claim 7, wherein the weights of the four basic motion-compensated frames at each element of an output frame are computed using corresponding values of two scalar fields, named side selector field and vector selector field.

9. The method of claim 8, where the side selector field is computed using a result of spatial filtering of a raw side difference field, and wherein the vector selector field is computed using a result of spatial filtering of a raw vector difference field.

10. The method of claim 9, wherein elements of the raw side difference field and elements of the raw vector difference field are computed using corresponding elements of four projection error fields, named forward native error field, forward foreign error field, backward native error field and backward foreign error field.

11. The method of claim 10, wherein each element of the forward native error field is computed by:
taking a vector of the REPAIRED_FWD vector field at a current spatial position;
applying the vector to the current spatial position at a temporal position of the interpolated frame;
projecting the vector to a temporal position of the B frame, interpolating a value of the REPAIRED_FWD vector field at the projected position; and
computing an error distance between the original vector and the interpolated vector,
wherein each element of the forward foreign error field is computed by:
taking a vector of the REPAIRED_FWD vector field at a current spatial position;
applying the vector to the current spatial position at a temporal position of the interpolated frame;
projecting the vector to a temporal position of the C frame;
interpolating a value of the REPAIRED_BCK vector field at the projected position; and
computing an error distance between the original vector and the inverted value of the interpolated vector,
wherein each element of the backward native error field is computed by:
taking a vector of the REPAIRED_BCK vector field at a current spatial position;
applying the vector to the current spatial position at a temporal position of the interpolated frame;
projecting the vector to a temporal position of the C frame;
interpolating a value of the REPAIRED_BCK vector field at the projected position; and
computing an error distance between the original vector and the interpolated vector, and
wherein each element of the backward foreign error field is computed by:

taking a vector of the REPAIRED_BCK vector field at a current spatial position;

applying the vector to the current spatial position at a temporal position of the interpolated frame;

projecting the vector to a temporal position of the B frame; interpolating a value of the REPAIRED_FWD vector field at the projected position; and computing an error distance between the original vector and the inverted value of the interpolated vector.

12. A motion compensation device configured to generate a motion-compensated video frame based on four successive frames of an original video sequence, wherein the four successive frames comprise a first frame A, a second frame B, a third frame C and a fourth frame D, the device comprising:

a receiver configured to obtain three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B, and wherein a third pair comprises a forward motion vector field C_FWD from C to D and a backward motion vector field D_BCK from D to the C; and a processor configured to generate the motion-compensated video frame based on interpolating between the frames B and C, using the three successive motion estimation pairs.

13. A computer program product comprising computer executable instructions stored on a non-transitory computer readable medium such that when executed by a processor cause a motion compensation device to:

obtain three successive motion estimation pairs, wherein a first pair comprises a forward motion vector field A_FWD from A to B and a backward motion vector field B_BCK from B to A, wherein a second pair comprises a forward motion vector field B_FWD from B to C and a backward motion vector field C_BCK from C to B, and wherein a third pair comprises a forward motion vector field C_FWD from C to D and a backward motion vector field D_BCK from D to the C; and generate the motion-compensated video frame based on interpolating between the frames B and C, using the three successive motion estimation pairs.

14. The computer program product of claim 13, further comprising repairing the motion vector fields B_FWD and C_BCK to provide a repaired forward motion vector field REPAIRED_FWD from B to C and a repaired backward motion vector field REPAIRED_BCK from C to B.

15. The computer program product of claim 14, wherein each vector of the REPAIRED_FWD field is set either to a vector of the B_FWD field taken at a same spatial position, or to an inverted vector of the B_BCK field taken at a same spatial position, and wherein each vector of the REPAIRED_BCK field is set either to a vector of the C_BCK field taken at a same spatial position, or to an inverted vector of the C_FWD field taken at a same spatial position.

16. The computer program product of claim 15, wherein selection of each vector of the REPAIRED_FWD field between the corresponding vector of the B_FWD field and the corresponding inverted vector of the B_BCK field is based on a comparison of corresponding elements of two coincidence error fields, a B_FWD coincidence error field with respect to the B_FWD field and a B_BCK coincidence error field with respect to the B_BCK field, and wherein selection of each vector of the REPAIRED_BCK field between the corresponding vector of the C_BCK field and the corresponding inverted vector of the C_FWD field is based on a comparison of corresponding elements of two coincidence error fields, a C_BCK coincidence error field with respect to the C_BCK field and a C_FWD coincidence error field with respect to the C_FWD field.

17. The computer program product of claim 16, wherein the B_FWD coincidence error field is computed by spatial filtering of a raw B_FWD coincidence field, wherein the B_BCK coincidence error field is computed by spatial filtering of a raw B_BCK coincidence field, wherein the C_BCK coincidence error field is computed by spatial filtering of a raw C_BCK coincidence field, and wherein the C_FWD coincidence error field is computed by spatial filtering of a raw C_FWD coincidence field.

18. The computer program product of claim 17, wherein each element of the raw B_FWD coincidence field is computed by:

projecting the corresponding vector of the B_FWD field into a temporal position of the C frame;

interpolating a value of the C_BCK vector field at the projected position; and computing an error distance between the original vector and the inverted value of the interpolated vector, wherein each element of the raw B_BCK coincidence field is computed by:

projecting the corresponding vector of the B_BCK field into a temporal position of the A frame;

interpolating a value of the A_FWD vector field at the projected position; and computing an error distance between the original vector and the inverted value of the interpolated vector, wherein each element of the raw C_BCK coincidence field is computed by:

projecting the corresponding vector of the C_BCK field into a temporal position of the B frame;

interpolating a value of the B_FWD vector field at the projected position; and computing an error distance between the original vector and the inverted value of the interpolated vector, and wherein each element of the raw C_FWD coincidence field is computed by:

projecting the corresponding vector of the C_FWD field into a temporal position of the D frame;

interpolating a value of the D_BCK vector field at the projected position; and computing an error distance between the original vector and the inverted value of the interpolated vector.

* * * * *